United States Patent
Cherif et al.

(10) Patent No.: US 11,558,259 B2
(45) Date of Patent: Jan. 17, 2023

(54) SYSTEM AND METHOD FOR GENERATING AND USING PHYSICAL ROADMAPS IN NETWORK SYNTHESIS

(71) Applicant: ARTERIS, INC., Campbell, CA (US)

(72) Inventors: Moez Cherif, Santa Cruz, CA (US); Benoit de Lescure, Campbell, CA (US)

(73) Assignee: ARTERIS, INC., Campbell, CA (US)

( * ) Notice: Subject to any disclaimer, the term of this patent is extended or adjusted under 35 U.S.C. 154(b) by 148 days.

(21) Appl. No.: 17/002,186

(22) Filed: Aug. 25, 2020

(65) Prior Publication Data

US 2021/0203557 A1 Jul. 1, 2021

Related U.S. Application Data

(63) Continuation-in-part of application No. 16/728,335, filed on Dec. 27, 2019, now Pat. No. 11,121,933.

(51) Int. Cl.

| | | |
|---|---|---|
| *G06F 30/30* | (2020.01) | |
| *H04L 41/12* | (2022.01) | |
| *G06F 30/392* | (2020.01) | |
| *G06F 30/327* | (2020.01) | |
| *G06F 30/394* | (2020.01) | |
| *G06F 115/02* | (2020.01) | |

(Continued)

(52) U.S. Cl.
CPC ............ *H04L 41/12* (2013.01); *G06F 30/327* (2020.01); *G06F 30/392* (2020.01); *G06F 30/394* (2020.01); *G06F 2111/04* (2020.01); *G06F 2115/02* (2020.01); *G06F 2115/12* (2020.01)

(58) Field of Classification Search
CPC ..... H04L 41/12; G06F 30/327; G06F 30/392; G06F 30/394; G06F 2111/04; G06F 2115/02; G06F 2115/12; G06F 30/39

USPC ........................................................ 716/126
See application file for complete search history.

(56) References Cited

U.S. PATENT DOCUMENTS

| | | | |
|---|---|---|---|
| 5,485,396 | A | 1/1996 | Brasen et al. |
| 5,623,420 | A | 4/1997 | Yee et al. |

(Continued)

FOREIGN PATENT DOCUMENTS

| | | |
|---|---|---|
| CN | 109587081 A | 4/2019 |
| CN | 113051215 A | 6/2021 |
| DE | 102015014851 A1 | 5/2016 |

OTHER PUBLICATIONS

Alessandro Pinto et al: "System level design paradigms", ACM Transactions on Design Automation of Electronic Systems, ACM, New York, NY, US, vol. 11, No. 3, Jun. 7, 2004 (Jun. 7, 2004), pp. 537-563, XP058222500.

(Continued)

*Primary Examiner* — Jack Chiang
*Assistant Examiner* — Brandon Bowers
(74) *Attorney, Agent, or Firm* — Dana Legal Services; Jubin Dana

(57) ABSTRACT

A system and methods are disclosed that generate a physical roadmap for the connectivity of a network, such as a network-on-chip (NoC). The roadmap includes a set of possible positions for placement of edges and nodes, which are known to be an acceptable and good position for placement of these network elements, that honors the constraints of the network. These known positions are made available to the system for synthesis of the network and generating the connectivity and placement based on the physical roadmap.

8 Claims, 18 Drawing Sheets

(51) Int. Cl.
*G06F 115/12* (2020.01)
*G06F 111/04* (2020.01)

(56) References Cited

U.S. PATENT DOCUMENTS

| | | | |
|---|---|---|---|
| 5,638,288 | A | 6/1997 | Deeley |
| 5,761,078 | A | 6/1998 | Fuller et al. |
| 5,903,886 | A | 5/1999 | Heimlich et al. |
| 5,983,277 | A | 11/1999 | Heile et al. |
| 6,002,857 | A | 12/1999 | Ramachandran |
| 6,134,705 | A | 10/2000 | Pedersen et al. |
| 6,145,117 | A | 11/2000 | Eng |
| 6,249,902 | B1 | 6/2001 | Igusa et al. |
| 6,360,356 | B1 | 3/2002 | Eng |
| 6,378,121 | B2 | 4/2002 | Hiraga |
| 6,437,804 | B1 | 8/2002 | Ibe et al. |
| 6,449,761 | B1 | 9/2002 | Greidinger et al. |
| 6,622,225 | B1 | 9/2003 | Kessler et al. |
| 6,883,455 | B2 | 4/2005 | Maeda et al. |
| 6,907,591 | B1 | 6/2005 | Teig et al. |
| 7,096,436 | B2 | 8/2006 | Bednar et al. |
| 7,398,497 | B2 | 7/2008 | Sato et al. |
| 7,587,687 | B2 | 9/2009 | Watanabe et al. |
| 7,788,625 | B1 | 8/2010 | Donlin et al. |
| 8,819,611 | B2 | 8/2014 | Philip et al. |
| 9,184,998 | B2 | 11/2015 | Xue |
| 9,444,702 | B1 | 9/2016 | Raponi et al. |
| 9,569,574 | B1 | 2/2017 | Khan et al. |
| 9,792,397 | B1 | 10/2017 | Nagaraja |
| 9,825,779 | B2 | 11/2017 | Ruymbeke et al. |
| 9,940,423 | B2 | 4/2018 | Lescure |
| 10,068,047 | B1 | 9/2018 | Finn |
| 10,282,502 | B1 | 5/2019 | Bshara et al. |
| 10,348,563 | B2 | 7/2019 | Rao et al. |
| 10,460,062 | B2 | 10/2019 | Feld et al. |
| 10,990,724 | B1 | 4/2021 | Cherif et al. |
| 11,121,933 | B2 | 9/2021 | Cherif et al. |
| 11,281,827 | B1 | 3/2022 | Labib et al. |
| 2003/0093765 | A1 | 5/2003 | Lam et al. |
| 2004/0040007 | A1 | 2/2004 | Harn |
| 2004/0230919 | A1 | 11/2004 | Balasubramanian et al. |
| 2005/0073316 | A1 | 4/2005 | Graham |
| 2005/0268258 | A1 | 12/2005 | Decker |
| 2007/0174795 | A1 | 7/2007 | Lavagno et al. |
| 2008/0046854 | A1 | 2/2008 | Tang |
| 2008/0049753 | A1 | 2/2008 | Heinze et al. |
| 2008/0279183 | A1 | 11/2008 | Wiley et al. |
| 2008/0291826 | A1 | 11/2008 | Licardie et al. |
| 2009/0031277 | A1 | 1/2009 | Mcelvain et al. |
| 2009/0313592 | A1 | 12/2009 | Murali et al. |
| 2010/0061352 | A1 | 3/2010 | Fasolo et al. |
| 2010/0218146 | A1 | 8/2010 | Platzker et al. |
| 2011/0170406 | A1 | 7/2011 | Krishnaswamy |
| 2012/0013509 | A1 | 1/2012 | Wisherd et al. |
| 2012/0311512 | A1 | 12/2012 | Michel et al. |
| 2013/0174113 | A1 | 7/2013 | Lecler et al. |
| 2013/0258847 | A1 | 10/2013 | Zhang et al. |
| 2013/0283226 | A1 | 10/2013 | Ho et al. |
| 2014/0115218 | A1 | 4/2014 | Philip et al. |
| 2014/0126572 | A1 | 5/2014 | Hutton et al. |
| 2014/0153575 | A1 | 6/2014 | Munoz |
| 2014/0160939 | A1 | 6/2014 | Arad et al. |
| 2014/0211622 | A1 | 7/2014 | Kumar et al. |
| 2014/0298281 | A1 | 10/2014 | Varadarajan et al. |
| 2015/0036536 | A1 | 2/2015 | Kumar et al. |
| 2015/0178435 | A1 | 6/2015 | Kumar |
| 2015/0341224 | A1 | 11/2015 | Van et al. |
| 2015/0347641 | A1 | 12/2015 | Gristede et al. |
| 2016/0103943 | A1 | 4/2016 | Xia et al. |
| 2016/0275213 | A1 | 9/2016 | Tomita |
| 2017/0063734 | A1 | 3/2017 | Kumar |
| 2017/0177778 | A1 | 6/2017 | Lescure |
| 2018/0115487 | A1 | 4/2018 | Thubert et al. |
| 2018/0144071 | A1 | 5/2018 | Yu et al. |
| 2018/0227180 | A1 | 8/2018 | Rao et al. |
| 2019/0073440 | A1 | 3/2019 | Farbiz et al. |
| 2019/0246989 | A1 | 8/2019 | Genov et al. |
| 2019/0260504 | A1 | 8/2019 | Philip et al. |
| 2019/0363789 | A1 | 11/2019 | Lee et al. |
| 2020/0092230 | A1 | 3/2020 | Schultz et al. |
| 2020/0162335 | A1* | 5/2020 | Chen ............ H04L 12/44 |
| 2020/0366607 | A1 | 11/2020 | Kommula et al. |
| 2021/0203557 | A1 | 7/2021 | Cherif et al. |
| 2021/0320869 | A1 | 10/2021 | Bourai et al. |

OTHER PUBLICATIONS

Bo Huang et al: "Application-Specific Network-on-Chip synthesis with topology-aware floorplanning", Integrated Circuits and Systems Design (SBCCI), 2012 25th Symposium on, IEEE, Aug. 30, 2012 (Aug. 30, 2012), pp. 1-6, XP032471227.

Srinivasan K. et al: "Linear programming based techniques for synthesis of network-on-chip architectures", Computer Design: VLSI in Computers and Processors, 2004. ICCD 2004. Proceedings. IEEE International Conference on San Jose, CA, USA Oct. 11-13, 2004, Piscataway, NJ, USA, IEEE. Oct. 11, 2004 (Oct. 11, 2004), pp. 422-429, XP010736641.

David Atienza et al, Network-on-Chip Design and Synthesis Outlook, Science Direct, Integration the VLSI, journal 41 (2008) 340-359.

Jean-Jacques Lecler et al: Application driven network-on-chip architecture exploration& refinement for a complex SoC, Design Automation for Embedded Systems, vol. 15 No. 2, Apr. 7, 2011, DOI: 10.1007/S10617-011-9075-5.

Srinivasan Mural et al: "Mapping and physical planning of networks-on-chip architectures with quality-of-service guarantees", Proceedings of the 2005 Asia and South Pacific Design Automation Conference, Jan. 18, 2005, DOI: 10.1145/1120725.1120737.

Tobias Bjerregaard et al: "A Router Architecture for Connection-Oriented Service Guarantees in the MANGO Clockless Network-on-Chip", Proceedings of the IEEE Conference and Exhibition on Design, Automation, and Test in Europe, Mar. 7, 2005, DOI: 10.1109/DATE.2005.36.

Wei Zhong et al: "Floorplanning and Topology Synthesis for Application-Specific Network-on-Chips", IEICE Transactions on Fundamentals of Electronics< Communications and Computer Sciences, Jun. 1, 2013, DOI: 10.1587/TRANSFUN.E96.A.1174.

Zhou Rongrong et al: A Network Components Insertion Method for 3D Application-Specific Network-on-Chip, Proceedings of the 11th IEEE International Conference on ASIC, Nov. 3, 2015, pp. 1-4, DOI: 10.1109/ASICON.2015.7516952.

Partha et al., Design, Synthesis, and Test of Networks on Chips, IEEE (Year: 2005).

Dumitriu Vet al: "Throughput-Oriented Noc Topology Generation and Analysis for High Performance SoCs", IEEE Transactions on Very Large Scale Integration (VLSI) Systems, IEEE Service Center, Piscataway, NJ, USA, vol. 17, No. 10, Oct. 1, 2009 (Oct. 1, 2009), pp. 1433-1446, XP011267808, ISSN: 1063-8210, DOI: 10.1109/TVLSI.2008.2004592.

Fangfa Fu et al: "A Noc performance evaluation platform supporting designs at multiple levels of abstraction", Industrial Electronics and Applications, 2009. ICIEA 2009. 4th IEEE Conference on, IEEE, Piscataway, NJ, USA, May 25, 2009 (May 25, 2009), pp. 425-429, XP031482069, ISBN: 978-1-4244-2799-4 *abstract* * p. 426-p. 429 *.

Murali et al: "Synthesis of Predictable Networks-on-Chip-Based Interconnect Architectures for Chip Multiprocessors", IEEE Transactions on Very Large Scale Integration (VLSI) Systems, IEEE Service Center, Piscataway, NJ, USA, vol. 15, No. 8, Aug. 1, 2007 (Aug. 1, 2007), pp. 869-880, XP011187732, ISSN: 1063-8210, DOI: 10.1109/TVLSI.2007.900742.

Picornell Tomas Tompic@gap.upv.es et al: "DCFNoC A Delayed Conflict-Free Time Division Multiplexing Network on Chip", Designing Interactive Systems Conference, ACM, 2 Penn Plaza, Suite 701 New York NY10121-0701 USA, Jun. 2, 2019 (Jun. 2, 2019), pp. 1-6, XP058637807, DOI: 10.1145/3316781.3317794 ISBN: 978-1-4503-5850-7.

U.S. Appl. No. 17/134,384, dated Dec. 26, 2020, Angiolini.

(56) References Cited

OTHER PUBLICATIONS

U.S. Appl. No. 17/665,578, dated Feb. 6, 2022, Janac.
"A distributed interleaving scheme for efficient access to wideIO dram memory", Seiculescu Ciprian, Benini Luca, De Micheli Giovanni, CODES+ISSS'12 (Year: 2012).
"Thread-Fair Memory Request Reordering"; Kun Fang, Nick Iliev, Ehsan Noohi, Suyu Zhang, and Zhichun Zhu; Dept. of ECE, Univeristy of Illinois at Chicago; JWAC-3 Jun. 9, 2012.
19th Asia and South Pacific Design Automation Conference Alberto Ghiribaldi, Hervé Tatenguem Fankem, Federico Angiolini, Mikkel Stensgaard, Tobias Bjerregaard, Davide Bertozzi A Vertically Integrated and Interoperable Multi-Vendor Synthesis Flow for Predictable NoC Design in Nanoscale Technologies.
ACM ICCAD '06 Srinivasan Murali, Paolo Meloni, Federico Angiolini, David Atienza, Salvatore Carta, Luca Benini, Giovanni De Micheli, Luigi Raffo Designing Application-Specific Networks on Chips with Floorplan Information p. 8, Figure 8.
Annual IEEE International SoC Conference Proceedings Mohammad reza Kakoee, Federico Angiolin, Srinivasan Murali, Antonio Pullini, Ciprian Seiculescu, and Luca Benini A Floorplan-aware Interactive Tool Flow for NoC Design and Synthesis pp. 1, 2, 4 2009 Belfast, Northern Ireland, UK.
K. R. Manik et al., "Methodology for Design of Optimum NOC Based on I PG," 2017 Int'l Conference on Algorithms, Methodology, Model and Applications in Emerging Technologies (ICAM-MAET), Chennai, India, IEEE, 6 pages. (Year: 2017).
Luca Benini: "Application specific Noc design", Design, Automation and Test in Europe, 2006, Date '06 : Mar. 6-10, 2006, [Munich, Germany; Proceedings] / [Sponsored by the European Design and Automation Association], IEEE, Piscataway, NJ, USA, Mar. 6, 2006 (Mar. 6, 2006), pp. 491-495, XP058393584, ISBN: 9783981080100.

* cited by examiner

SYSTEM AND METHOD FOR GENERATING AND USING PHYSICAL ROADMAPS IN NETWORK SYNTHESIS

CROSS REFERENCE TO RELATED APPLICATION

This application is a continuation-in-part of U.S. Non-Provisional patent application Ser. No. 16/728,335 titled PHYSICALLY AWARE TOPOLOGY SYNTHESIS OF A NETWORK filed on Dec. 27, 2019 by Moez CHERIF, et al., the entire disclosure of which is incorporated herein by reference.

FIELD OF THE INVENTION

The present technology is in the field of computer system design and, more specifically, related to generating a physical roadmap for synthesis of the topology of a network-on-chip (NoC).

BACKGROUND

Multiprocessor systems implemented in systems-on-chips (SoCs) communicate through networks, such as a network-on-chip (NoC). Intellectual Property (IP) blocks or elements or cores are used in chip design. The SoCs include instances of intellectual property (IP) blocks. Some IP blocks are masters. Some IP blocks are slaves. Masters and slaves communicate through a network, such as a NoC.

Transactions, in the form of packets, are sent from a master to one or more slaves using any of the many industry-standard protocols. The master, which is connected to the NoC, sends a request transaction to a slave. The master uses an address to select the slave. The NoC decodes the address and transports the request from the master to the slave. The slave handles the transaction and sends a response transaction, which is transported back by the NoC, to the master.

The design of a network, such as the NoC, within a floorplan takes into account all the communication links between all the masters and their corresponding slaves. The various communication paths are represented by a connectivity mapping for the NoC within the floorplan. The connectivity map must take into account the location of the IP blocks in the floorplan, which represent physical constraints in the floorplan. The floorplan also includes spaces, such as corridors, where links or edged can be placed. Some approaches, such as Voronoi-based techniques, allow only 1 edge per corridor and thereby limit optimal utilization of the available space in the floorplan for placement of edges. Thus, systems and process that create a network topology given a set of constraints need to decide the optimal number of nodes and edges, and the positions of the nodes and placement of the edge in the floorplan. Therefore, what is needed is a system and method that generates a model, such as a physical roadmap, for the connectivity requirements of the network with constraints. The physical roadmap must honor the constraints while meeting the connectivity requirements of the network.

SUMMARY OF THE INVENTION

In accordance with various embodiments and aspects of the invention, systems and methods are disclosed that generate a model for the connectivity of a network, such as a network-on-chip (NoC), while meeting the constraints of a floorplan. The model is a physical roadmap that includes a subset of points on the floorplan with paths connecting those points, where it is optimal to place network elements, during the synthesis, in order to minimize network metrics, such as wire length and distance between source nodes and sinks.

The system and method of the invention include generating a set of possible positions for placement of edges and nodes, which is known to be an acceptable and good position that honors the constraints of the floorplan. These known positions are made available for synthesis and generation of the network connectivity using the physical roadmap.

In accordance with the various aspects and embodiments of the invention, a physical roadmap model is generated that contains positions for edges and nodes and can be used efficiently and effectively for synthesis of the network. The system generates, as an output, a physical model. This model is referred to as a physical roadmap (or roadmap). The roadmap is used as a guide during the synthesis process. The synthesis process uses the roadmap and aims to leverage network synthesis. Using the roadmap also enables the system to systematically generate optimal or near-optimal topology solutions. Optimality and cost of a solution are considered with respect to physical-related metrics, and more specifically, routed wire length and minimum distance between a source (initiator) and a sink (target). The system for generating of the roadmap and the process, in accordance with the various aspects and embodiments of the invention, can be extended to other metrics, such as performance.

The use of the roadmap in network synthesis has many benefits and advantages. One advantage of the various aspects and embodiments of the invention includes providing fast throughput of a solution, such as a fast execution of the process and a good quality of results in terms of optimality and synthesis convergence.

Another advantage of using a roadmap is generation of a consolidated model of the physical paths, along which the synthesized network nodes and edges can be placed and routed because the roadmap represents locations that are known to be acceptable placement locations.

Another advantage is the roadmaps provide guidance to the system for synthesis of any type of network topology, be it regular or irregular. For example, topologies such as rings, meshes, or tori are naturally handled without embedding any explicit knowledge of their properties. As such, the roadmap generation and the network synthesis can be implemented on any topology under construction, including a mesh or any other regular structure.

Another advantage of using the roadmaps is optimal (or near-optimal) use of the physical space, such as channels, as well as the consideration of congested areas or constrained fences.

Another advantage of the invention is the ability to support incremental synthesis of a network topology. Through roadmaps, the system can quickly and easily expand and update the synthesis to accommodate changes in the problem specifications or constraints. For example, change in the size and positions of the forbidden regions (macros); the deletion or addition of source nodes (initiators) and/or sinks (targets); the deletion or addition of connections, which can result in planning for new paths; and changes in constraints (e.g., regions where the nodes need to be located).

BRIEF DESCRIPTION OF THE DRAWINGS

In order to more fully understand the invention, reference is made to the accompanying drawings or figures. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the presently understood best mode of the invention are described with additional detail through use of the accompanying drawings.

DETAILED DESCRIPTION

Figure 1:
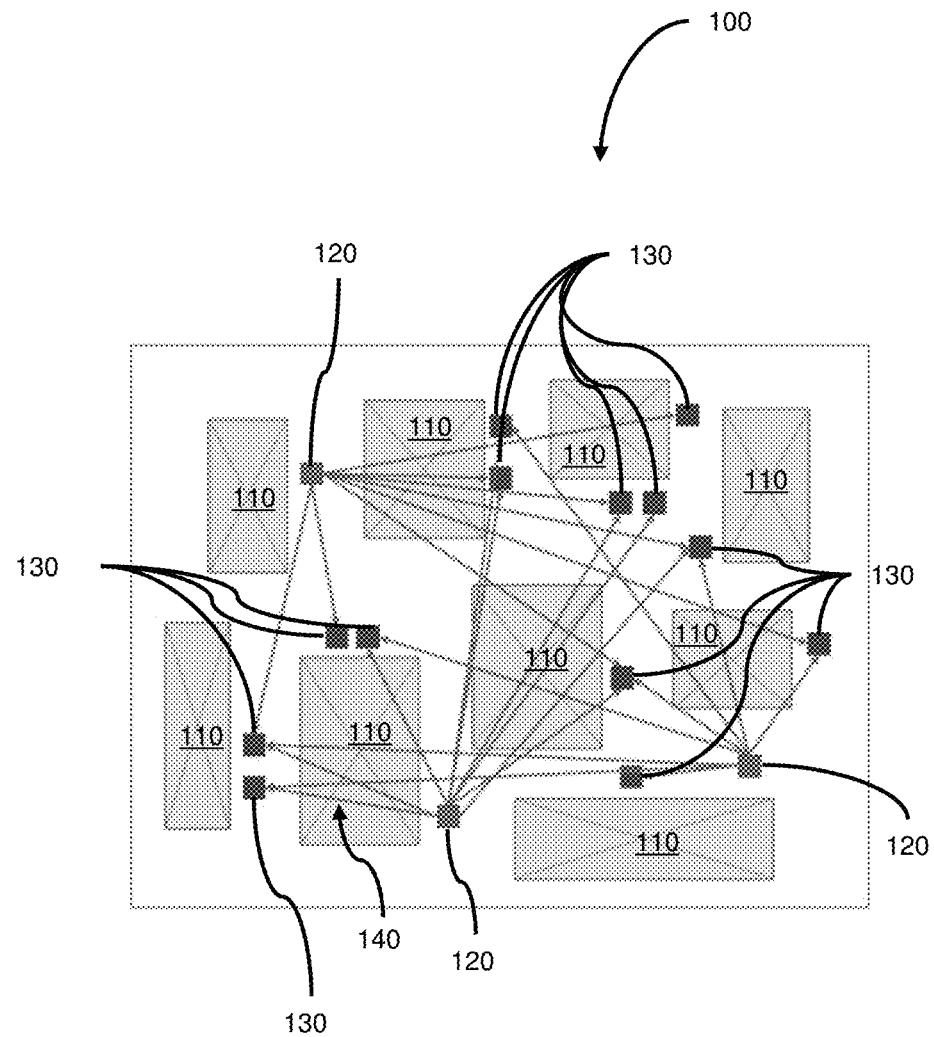
FIG. 1 shows a network's floorplan in accordance with the various aspects and embodiments of the invention.

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one aspect," "an aspect," "certain aspects," "various aspects," or similar language means that a particular aspect, feature, structure, or characteristic described in connection with any embodiment is included in at least one embodiment of the invention.

Appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting aspects and embodiments of the invention are intended to encompass both structural and functional equivalents thereof. It is intended that such equivalents include both currently known equivalents and equivalents developed in the future.

The terms "path" and "route" are used interchangeable herein. Paths includes and are made up of any combination of nodes and edges (edges are also referred to herein as links), along which data travels form source to destination (sink or target). As used herein, a "master," an "initiator," and "source node" refer to similar intellectual property (IP) blocks, units, or modules. The terms "master" and "initiator" and "source node" are used interchangeably within the scope and embodiments of the invention. As used herein, a "slave," a "target," and "sink node" refer to similar IP blocks; the terms "slave" and "target" and "sink node" are used interchangeably within the scope and embodiments of the invention. As used herein, a transaction may be a request transaction or a response transaction. Examples of request transactions include write request and read request.

As used herein, a node is defined as a distribution point or a communication endpoint that is capable of creating, receiving, and/or transmitting information over a communication path or channel. A node may refer to any one of the following: switches; splitters, mergers, buffers, and adapters. As used herein, splitters and mergers are switches; not all switches are splitters or mergers. As used herein and in accordance with the various aspects and embodiments of the invention, the term "splitter" describes a switch that has a single ingress port and multiple egress ports. As used herein and in accordance with the various aspects and embodiments of the invention, the term "merger" describes a switch that has a single egress port and multiple ingress ports.

Referring now to FIG. 1, a floorplan 100 for a network is shown in accordance with the various aspects and embodiments of the invention. The network's floorplan 100 includes constraint regions 110, which are floorplan restrictions or forbidden regions. The constraint regions 110 represent IP blocks in accordance with one aspect and embodiment of the invention. Other constraints can be added as part of the network or to the floorplan. The floorplan 100 also includes initiators or source nodes 120 in communication with targets or sink nodes 130 in accordance with the various aspects and embodiments of the invention. The scope of the invention is not limited by the number of source nodes and sink nodes in a given floorplan. The logic connectivity, in accordance with various aspects of the invention, between a given source node (an initiator) and sink node (a target) is depicted by solid arrows in the floorplan 100. The floorplan 100 includes communication connectivity using edges. For example, an edge 140 connect the source node 120 with a sink node 130. As indicated, forbidden regions 110 are areas on the floorplan that links or edges cannot traverse; the links must be placed in areas on the floorplan, such as corridors, that are not occupied by the forbidden regions 110. For generality, the source/sink nodes can be anywhere on the free space. In accordance with the various aspects and embodiments of the invention, the system receives, as an input, a structure implementing the floorplan 100 with the connectivity between the source nodes 120 and sink nodes 130. The floorplan 100 is provided to the system as a map, which includes the constrains and connectivity. The system processes the map using edge and node clustering to produce a more optimized structure.

Figure 2:
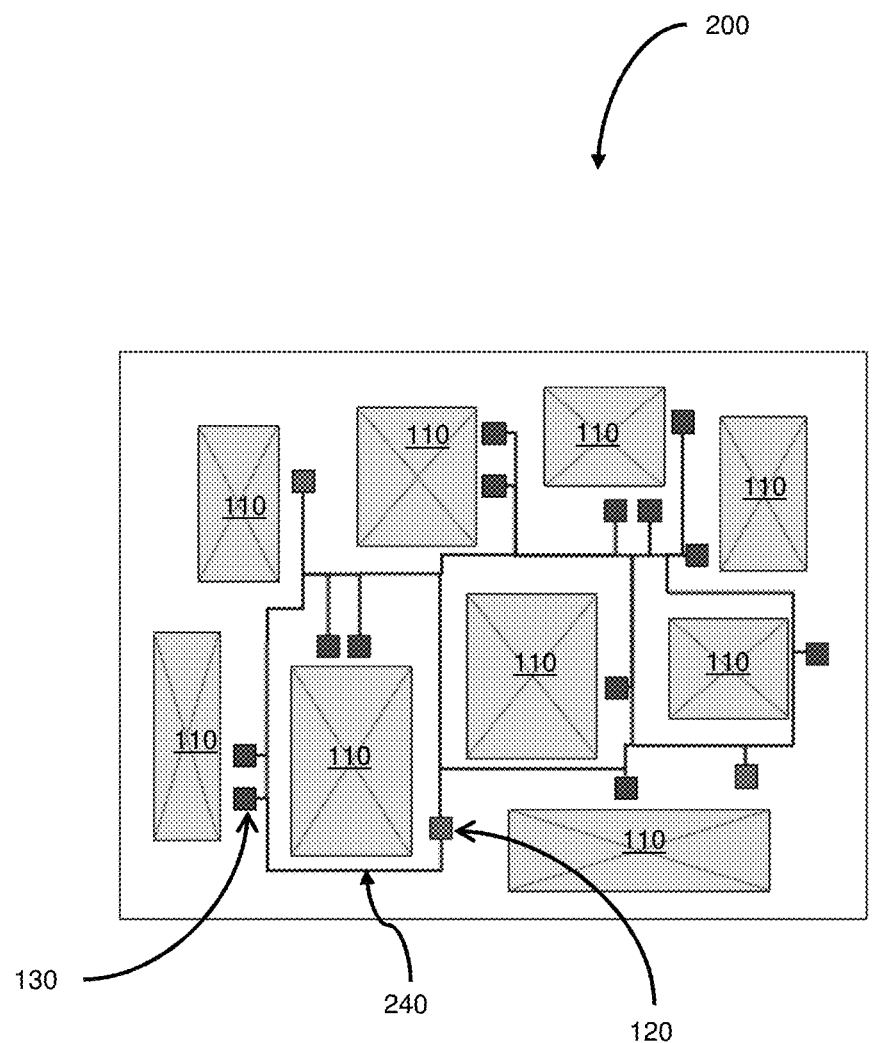
FIG. 2 shows a physical roadmap model built for the network of FIG. 1 in accordance with the various aspects and embodiments of the invention.

Referring now to FIG. 2, a model or physical roadmap 200 for the floorplan 100 in FIG. 1 is shown. The physical roadmap 200 is used by a network synthesis software to produce (near-)optimal topologies in presence of physical constraints. As detailed herein and in accordance with the various aspects of the invention, various techniques from the domain of robot path planning and combinatorial optimization are used to build the physical roadmap model. Additionally, using the roadmap allows for the possibility to efficiently synthesize a network when adding geometrical constraints to the floorplan and further constrain the roadmap model and hence the location of the network elements.

The roadmap 200 takes into consideration the blockage areas 110 when placing the paths that connect the source nodes 120 and sink nodes 130 on the floorplan. All of the nodes are placed at collision-free positions in the floorplan 100 and not on top of blockages areas 110. The edges, such as edge 240, of the roadmap 200 correspond to collision-free paths. All points lying along the edges or paths are collision-free. In accordance with the various embodiments of the invention, the edges or path are of three types: (1) paths originating at a source node and ending at an internal node, (2) paths originating at an internal node and ending at sink nodes, and (3) paths between internal nodes. In accordance with some aspects and embodiments of the invention, the internal nodes are nodes as defined herein, such as switches. In accordance with some aspects and embodiments of the invention, the roadmap 200 is represented by a data structure.

In accordance with the various aspects of the invention, the roadmap is represented by an undirected graph. In accordance with some embodiments, the undirected graph is an undirected cyclic graph. The undirected graph includes nodes, where the nodes are of three types: (1) source nodes corresponding to initiators, (2) sink nodes corresponding to targets, and (3) internal nodes corresponding to bifurcation points or merging points. Depending on the connectivity map for the targets and initiators, the roadmap 200 can be made of one or two or more disjoint graphs. For optimality and compactness purposes, the internal nodes are distributed across the free space in such a way that the edges (the paths) are canonical paths. such as vertical paths, horizontal paths; or more complex shapes. This graph model permits the alignment of the logical and physical structures of the roadmap.

The system's synthesis process, which is software executed by a processor, accesses the data structure. The roadmap 200 includes connectivity links, such as a connective link 240, that connect the source nodes, such as source node 120, with the respective sink nodes, such as the sink node 130. Thus, whatever the stage of the synthesis (i.e., splitting, clustering, restructuring, buffering, and optimization), the nodes are placed, using the roadmap, in such a way as to honor the constraints of the network and optimize (or near-optimize) the metrics. In accordance with some embodiments of the invention, the synthesis process builds a roadmap for the network by successive transformations of simpler elements, such as splitters and mergers, that are assembled to build the internal nodes or the switches.

Figure 3:
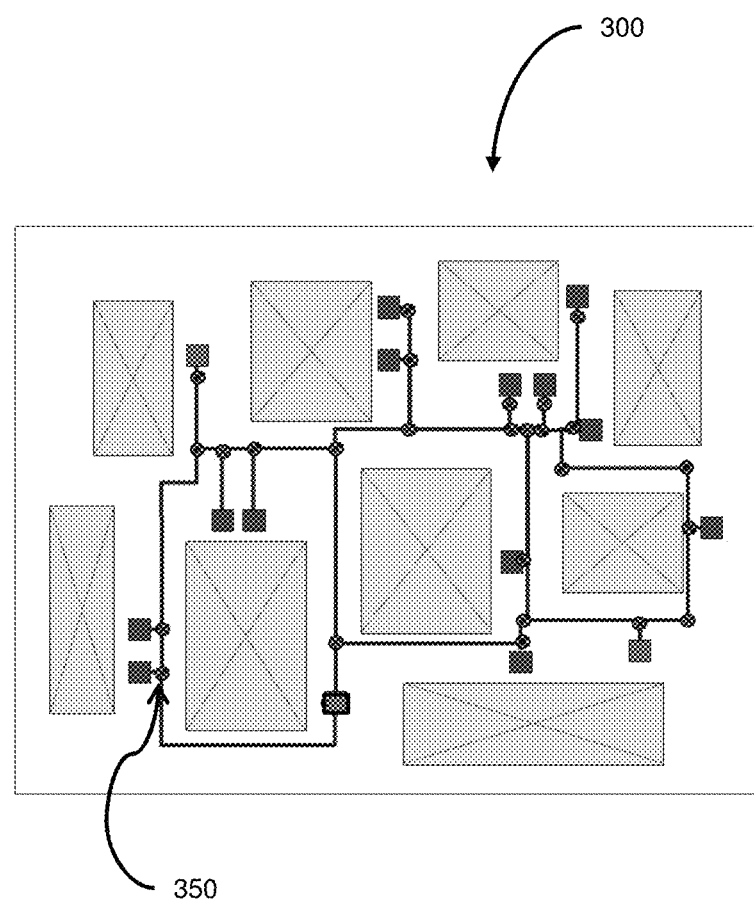
FIG. 3 shows the roadmap model of FIG. 2 with various switches, such as splitters and mergers along the edges, in accordance with the various aspects of the invention.

Referring now to FIG. 3, a roadmap 300 is shown with switches 350 in accordance with the various aspects and embodiments of the invention. The switches 350 may be splitters or mergers in accordance with the various aspects and embodiments of the invention. The switches 350 are located at the sink nodes and the source nodes. The switches 350 are placed in such a way that honors the constraints of the network, while optimizing the metrics.

The roadmap 300 is not the final synthesized network topology; the roadmap 300 is the set of locations, at which the nodes can be potentially placed. In accordance with other aspects and embodiment of the invention, various topology structures can be found and generated depending on the metrics and constraints of the network; the scope of the invention is not limited thereby. For example and in accordance with the various embodiments of the invention, the roadmap 300 is modeled by an undirected graph through duplicating and directing internal edges.

Figure 4:
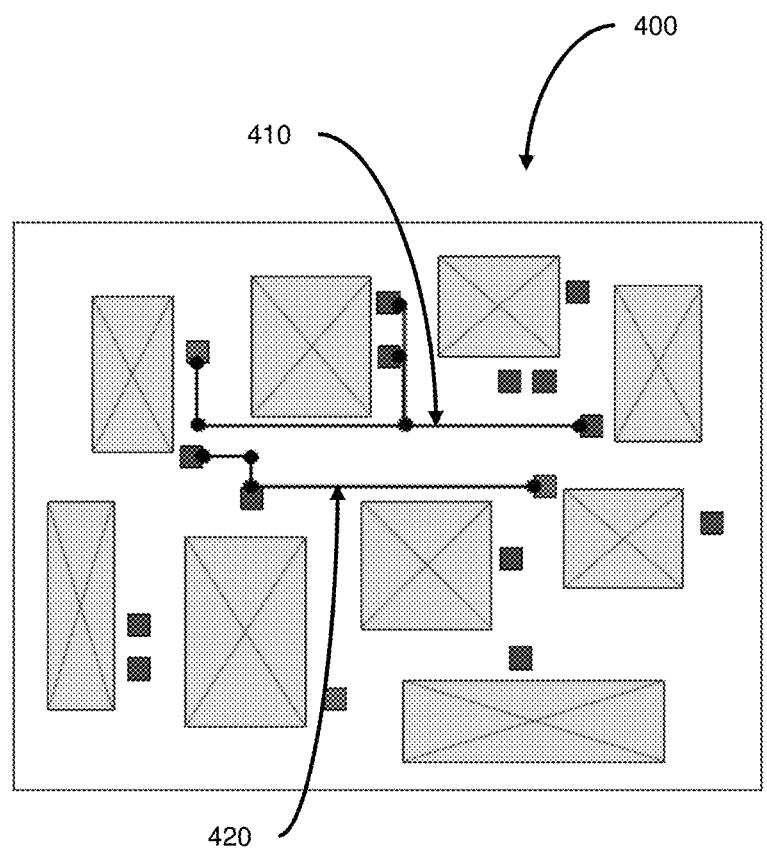
FIG. 4 shows a corridor in the floorplan with multiple edges in accordance with the various aspects and embodiments of the invention.

Referring now to FIG. 4, a roadmap 400 is shown with an edge 410 and an edge 420. Depending on the structure of the floorplan and the width of corridors between the forbidden regions, the roadmap 400 can have multiple edges traveling through the same corridor. A corridor is any space that is available for placement of an edge. In accordance with the various aspects and embodiment of the invention, the edge 410 and the edge 420 travel through the same corridor. In accordance with the various aspects and embodiment of the invention, the cycles are kept as part of the roadmap graph. The cycles are handled by synthesis process, which is in charge of providing cycle-free routes.

In accordance with the various aspects and embodiment of the invention, the roadmap is represented by a graph. The graph for the roadmap is a set of points known to be good locations for placing network elements. This results in greater efficiency during the synthesis process. Using the graph for the roadmap, the identified spaces where network elements can be placed or located are efficiently identifiable. This significantly reduces the search space during the synthesis process when deciding where to place network elements. Using the graphs of the roadmap, the network will be produced (near-)optimally based on the graph and the derived roadmap.

Figures 5, 6:
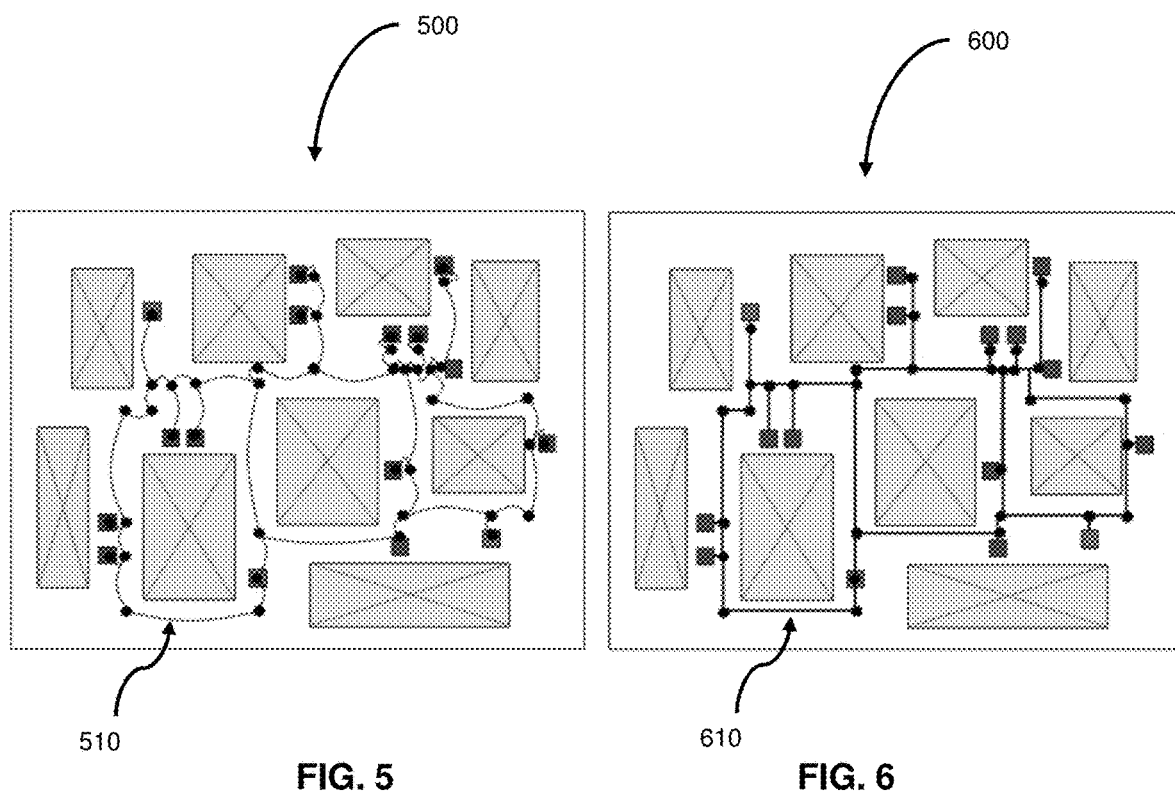
FIG. 5 shows a graph for a network, in accordance with the various aspects and embodiments of the invention of the invention.
FIG. 6 shows a roadmap for the network represented by the graph of FIG. 5, in accordance with the various aspects and embodiments of the invention of the invention.

Referring now to FIG. 5 and FIG. 6, an undirected cyclic graph 500 is shown for a corresponding roadmap 600. In accordance with various aspects and embodiment of the invention, the system builds the graph 500 using a point-to-point collision-free path planner and combines it with a global process in order to build up a unified graph of paths achieving the physical implementation of the initial source/sink connectivity map for the network. The graph 500 shows the various connectivity information for the network that is represented by the roadmap 600. For example, a connection path 510 of the graph 500 is shown as an edge 610 in the roadmap 600.

Figures 7, 8:
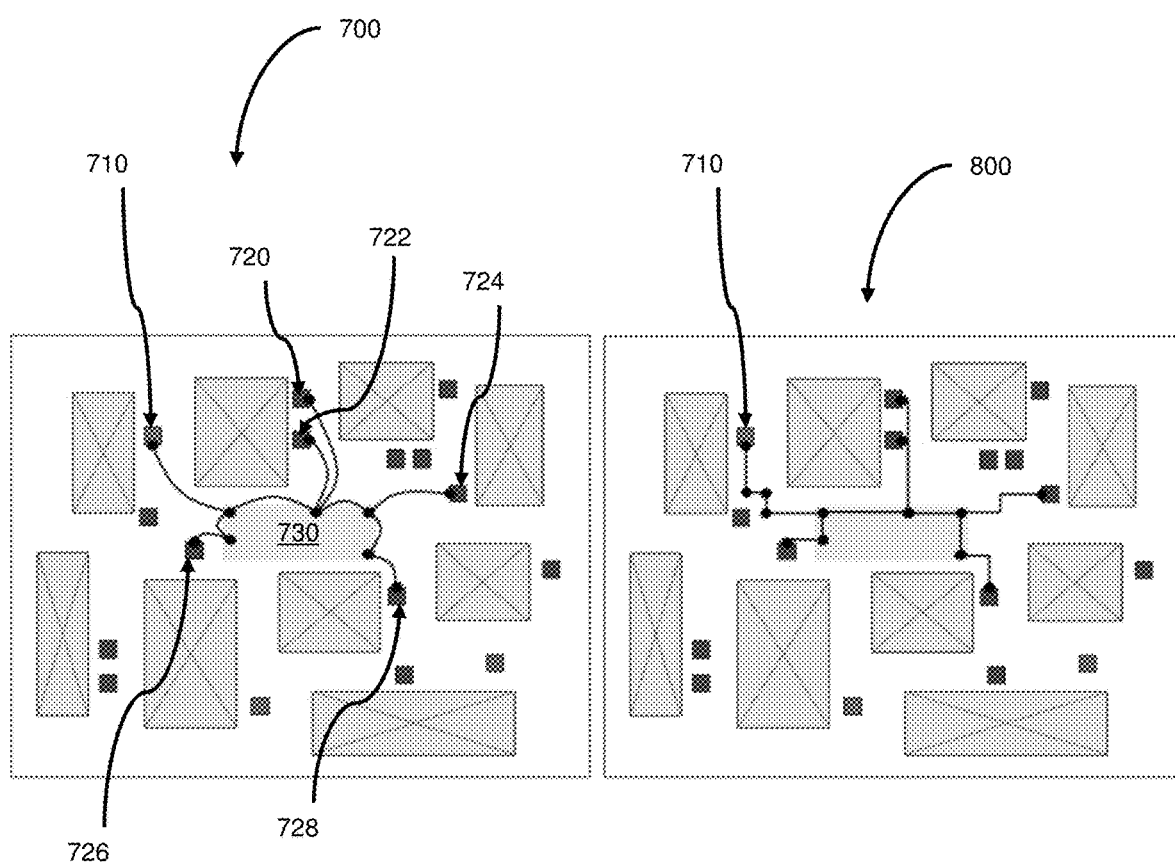
FIG. 7 shows a graph for a network, in accordance with the various aspects and embodiments of the invention of the invention.
FIG. 8 shows a roadmap for the network represented by the graph of FIG. 7, in accordance with the various aspects and embodiments of the invention of the invention.

Referring now to FIG. 7 and FIG. 8, a source node 710 is shown in communication with and connected to the sink nodes 720, 722, 724, 726, and 728. In accordance with the various embodiment of the invention, other type of constraints can be added to the roadmap building process, such as geometrical constraints. For example, network nodes that fall within the region defined by a fence, such as rectangle fence 730, can be constrained by connecting every endpoint directly to the constraining region. Then a local roadmap is built for the fence 730, which is inside the fence 730 to represent the connectivity. Thus, the source node 710 and the sink nodes 720-728 are all connected to nodes in the fence 730.

In accordance with the various aspects and embodiments of the invention, various techniques are combined to build a roadmap, so that each technique operates at a given level of the problem and for a specific purpose. In accordance with some aspects and embodiments of the invention, a point-to-point collision-free path planner is used to build a graph for the physical implementation of the network. In accordance with some aspects and embodiments of the invention, a point-to-point collision-free path planner is combined with a global process to build up a unified graph of paths achieving a physical implementation of the initial source/sink connectivity map. There are different scenarios for building the roadmap for a network, which include: Point-to-point planning of collision-free path; Point-to-many planning of collision-free tree of paths; and Many-to-many planning of collision-free forest of paths.

Figure 9:
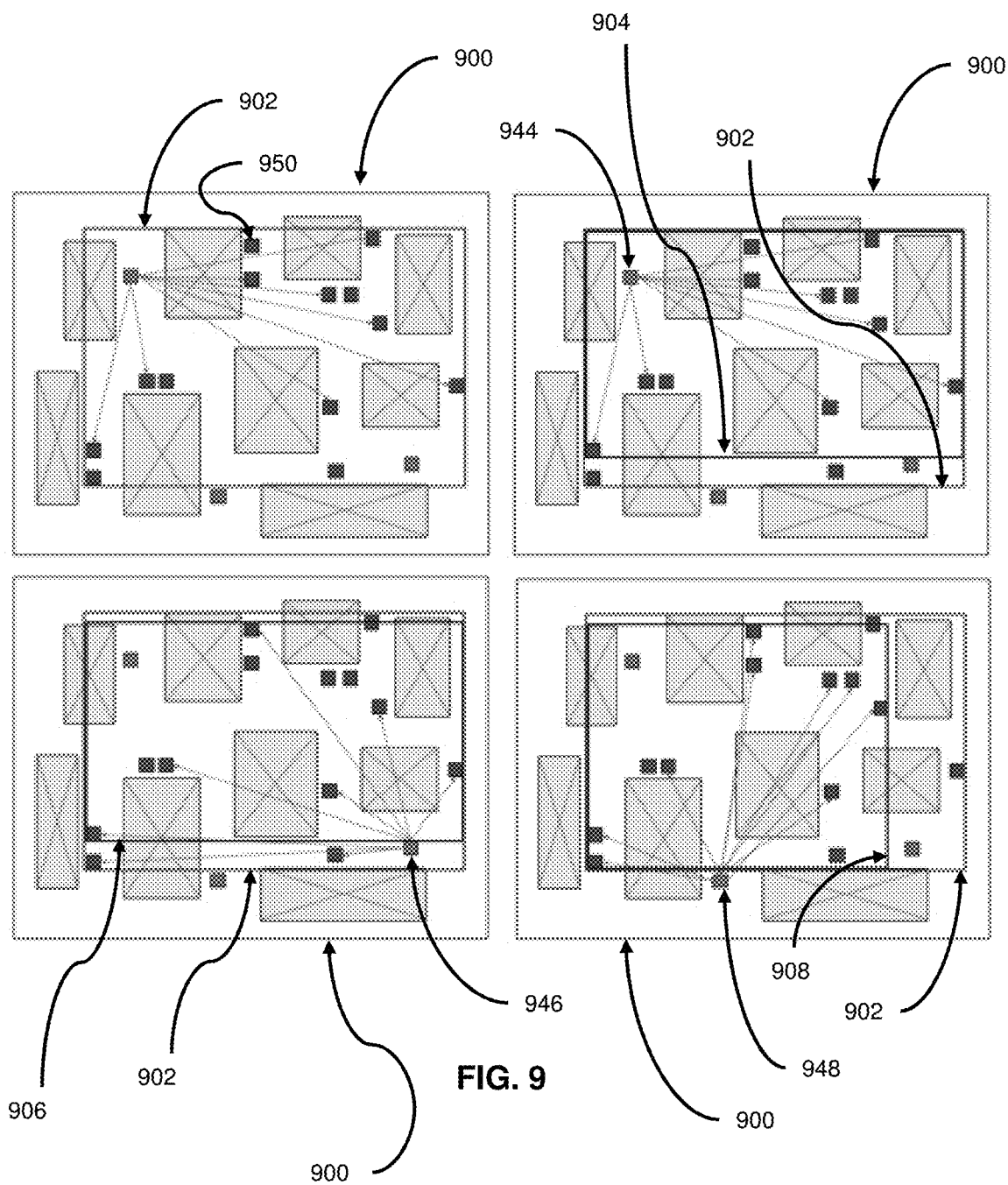
FIG. 9 shows bounding boxes for a floorplan representation of a network in accordance with the various aspects and embodiments of the invention of the invention.

Referring now to FIG. 9, a set of bounding boxes are shown for building roadmaps for a floorplan 900 with three source nodes 944, 946 and 948 in accordance with various embodiments and aspects of the invention. Each bounding box has an area. Bounding boxes 902 includes all sink nodes, such as sink node 950. The bounding box 902 is the englobing bounding box. In accordance with some aspects and embodiments of the invention, a bounding box is created for each of the source nodes and is sorted with its respective sink nodes. The system uses the process of traversing the set of source nodes and sorts the source nodes with respect to a "sink spreading" based cost function. In accordance with some aspects of the invention, the bounding box 904 is drawn to include all sink nodes connected to a source node 944. In accordance with some aspects of the invention, the bounding box 906 is drawn to include all sink nodes connected to a source node 946. In accordance with some aspects of the invention, the bounding box 908 is drawn to include all sink nodes connected to a source node 948.

Once the various bounding boxes for each source node is determined, the system is able to determine the cost function for each bounding box. This cost function is computed for each source node. For example, for any source node (initiator) $I_k$, the bounding box covering the respective sink nodes, which are connected to the source node $I_k$, is computed. The area of the bounding box is evaluated to determine a sink spreading factor, which is calculated as follows:

$$f(k)=(N_{sk}*A_k)/(N_s*A) \text{ where}$$

$N_{sk}$ is the number of sink nodes connected to the source node $I_k$;

$N_s$ is the total number of sink nodes in the floorplan being analyzed to generate the roadmap;

$A_k$ is area of the bounding box that surrounds all of the sink nodes of $I_k$ and $I_k$, which lies within the englobing bounding box; and A is the area of the englobing bounding box.

The source node with the highest sink spreading factor is the source node with an individual roadmap that (tree starting at that source and reaching all its sink nodes) spans most of the paths and nodes of the final global roadmap. In accordance with some aspects of the invention, the system uses the individual roadmap for the source node with the highest sink spreading factor to speed up the solution building throughput. The advantage is that it maximizes the size of the initial trunk to be computed and to be the base for the final roadmap.

Figure 10:
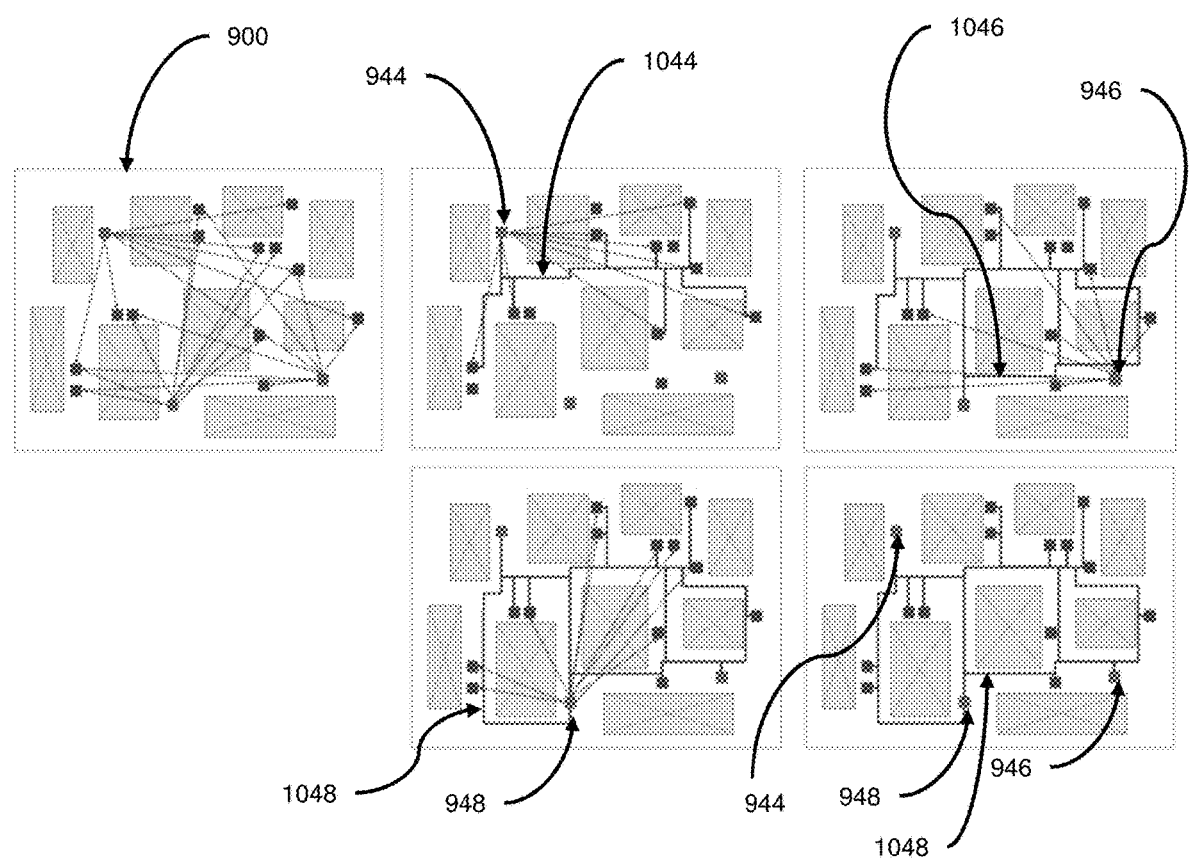
FIG. 10 shows an iterative process for generating a global roadmap by adding source nodes and their respective unconnected sink nodes a roadmap in accordance with the various aspects and embodiments of the invention of the invention.

Referring now to FIG. 10, an iterative process is shown for evaluating the list of sorted source nodes in the floorplan 900. The source nodes are sorted in decreasing order of sink spreading factor value, in accordance with the various aspects and embodiments of the invention. The leaves of any roadmap are the sink nodes that are connected to the source node.

In accordance with the various aspects and embodiments of the invention, at each iteration, one source node is selected from the list of sorted source nodes and an individual roadmap starting at that source node is generated.

In accordance with some aspects and embodiments of the invention, a source node is selected from the list of sorted source nodes and it is connected directly to the existing roadmap. The process then identifies all of the sink nodes, which are a subset of sink nodes for the selected source node directly connected to the existing roadmap, that are not already connected to the existing roadmap. The process then connects the subset of sink nodes to the existing roadmap. Once generated, the paths defining each individual roadmap are traversed and merged with existing paths of the existing roadmap under construction.

In accordance with the aspects of the invention, the source node 944 is selected. The individual roadmap 1044 for the source node 944, which has the highest score, is built. As this is the first source node selected, the resulting roadmap 1044 is the starting or initial global roadmap. In accordance with some aspects and embodiments of the invention, the system builds the global roadmap through connecting a source node 946 directly to the roadmap 1044. The system identifies the sink nodes that need to be connected to the source node 946. The system also determines which of the sink nodes are not already connected to the roadmap 1044 to generate a subset of sink nodes that are not connected to the roadmap 1044. The system connects the subset of sink nodes to the existing roadmap 1044 to generate an updated roadmap 1046. Thus, the source node 946 is connected to the roadmap 1044 to generate roadmap 1046. The roadmap 1046 now includes the second-ranked source node, source node 946, and the sink nodes for the source node 946. The roadmap 1046 is now the global roadmap. The source node 948 is selected next and the roadmap 1046 is expanded; the expansion of the roadmap 1046 includes connecting the third-ranked source node, source node 948, and the remaining sink nodes for the source node 948 to generate the roadmap 1048. The roadmap 1048 is now the global roadmap and depicts the final resulting roadmap for the three source nodes in this example.

Referring now to FIGS. 11A-11H, generation of an individual roadmap for the network 1100 is shown. In accordance with the various aspects of the invention the process uses a point-to-point collision free path planner for the network 1100. The path finder can be based on a greedy scheme, a heuristic scheme (such as A* technique), or a complete scheme (such as Dijkstra path finder or any technique of path planning). In accordance with the various advantage of the invention, the process for generating and building the roadmap for the network 1100 uses a rapid iterative method to generate a near-optimal tree starting at an arbitrary source node and ending at the connected sink nodes.

Figure 11A:
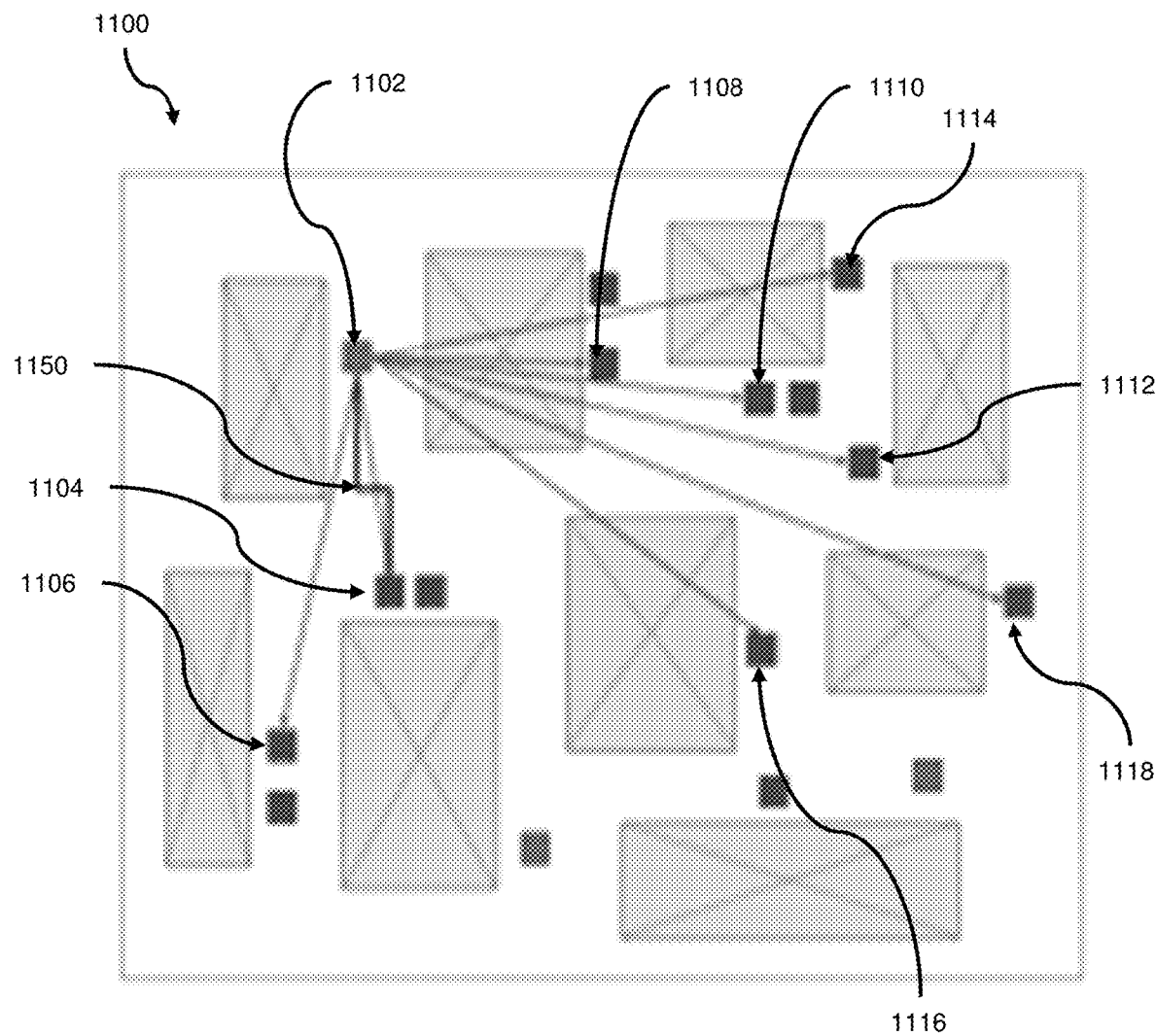
FIG. 11A-11H show sub-roadmaps that are built to result in a roadmap developed using an iterative process for connection a source node to all of its sink nodes in accordance with the various aspects and embodiments of the invention.

Referring to FIG. 11A, the process expands a tree starting at a first source nodes, such as source node 1102, that was selected to build the initial roadmap trunk. The initial collision-free path 1150 is identified and generated between source node 1102 and sink node 1104. The path 1150 is now part of a trunk that is built at this phase of the process for developing a final roadmap for the source node 1102. The process, at each iteration, selects a sink node that is the closest sink node to the already built trunk, such as path 1150, of the roadmap that is being generated.

Figure 11B:
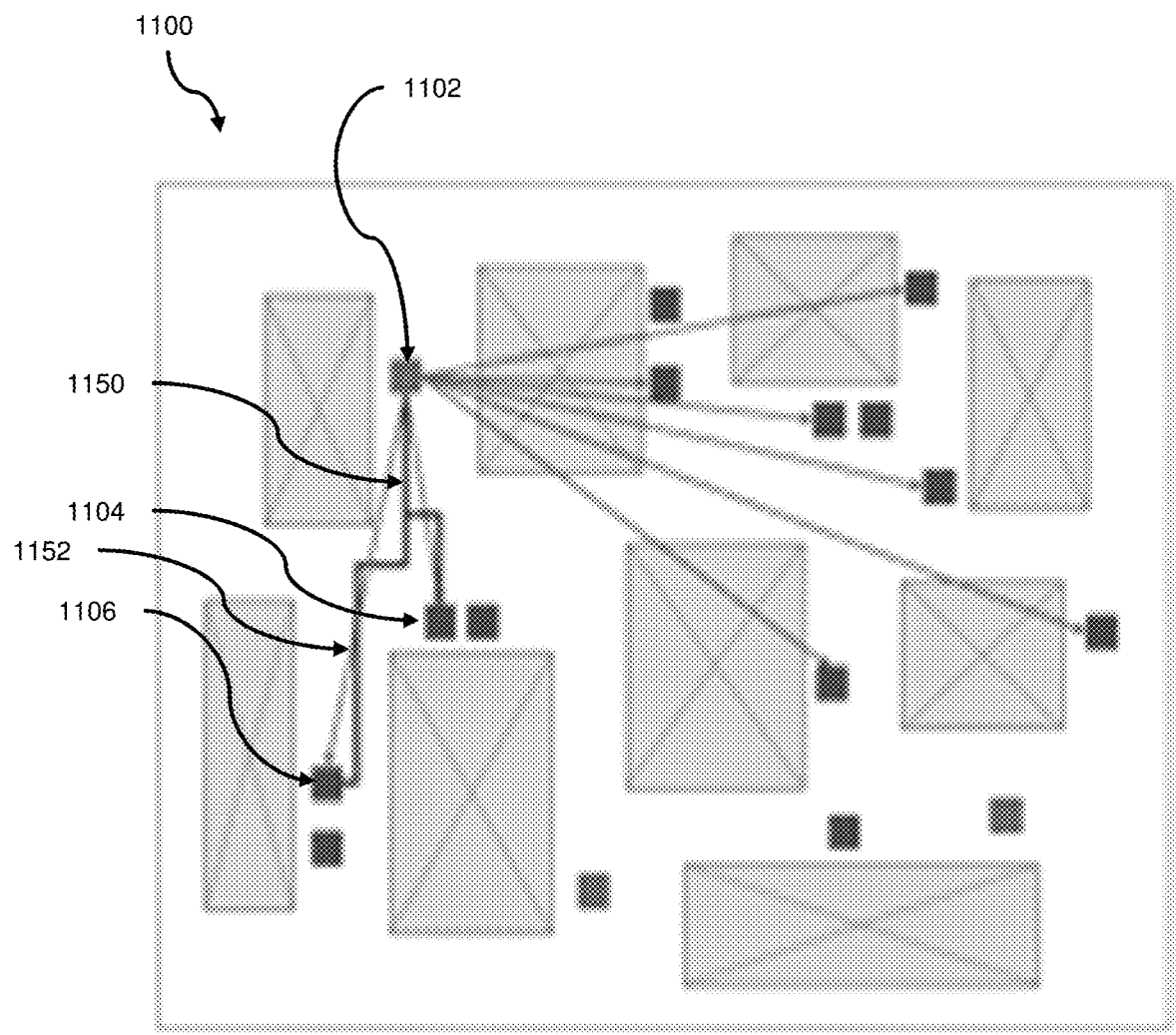

Referring now to FIG. 11B, a sink node 1106 is connected, using path 1152, to the trunk 1150 by executing the collision-free path finder. The generated path 1152 is then processed to generate a chain of internal nodes connected through canonical segments (vertical or horizontal). This chain, which represents the path 1152, is then added to the existing graph for the trunk 1150.

In accordance with the various aspects of the invention, at every iteration and until the entire set of sink nodes is reached, the system maintains a sorted list of pairs of points, where every pair is made of one of the remaining unreached sinks and its corresponding closest point on the existing roadmap.

Figure 11C:
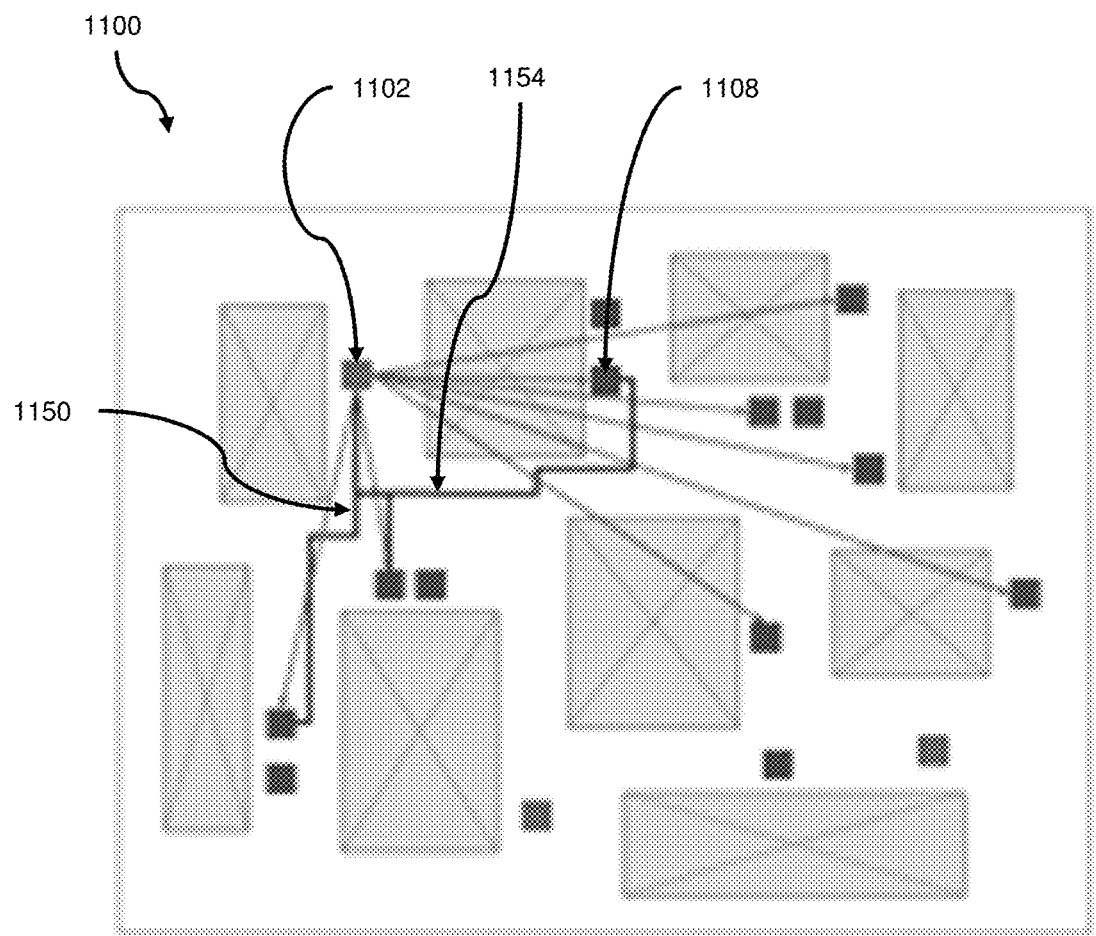

Referring now to FIG. 11C, the process selects a new closest sink node 1108. The sink node 1108 is connected, using path 1154, to the trunk 1150 by executing the collision-free path finder. The generated path 1154 is processed to generate a chain of internal nodes connected through canonical segments (vertical or horizontal). This chain, which represents the path 1154, is then added to the existing graph for the trunk 1150.

Figure 11D:
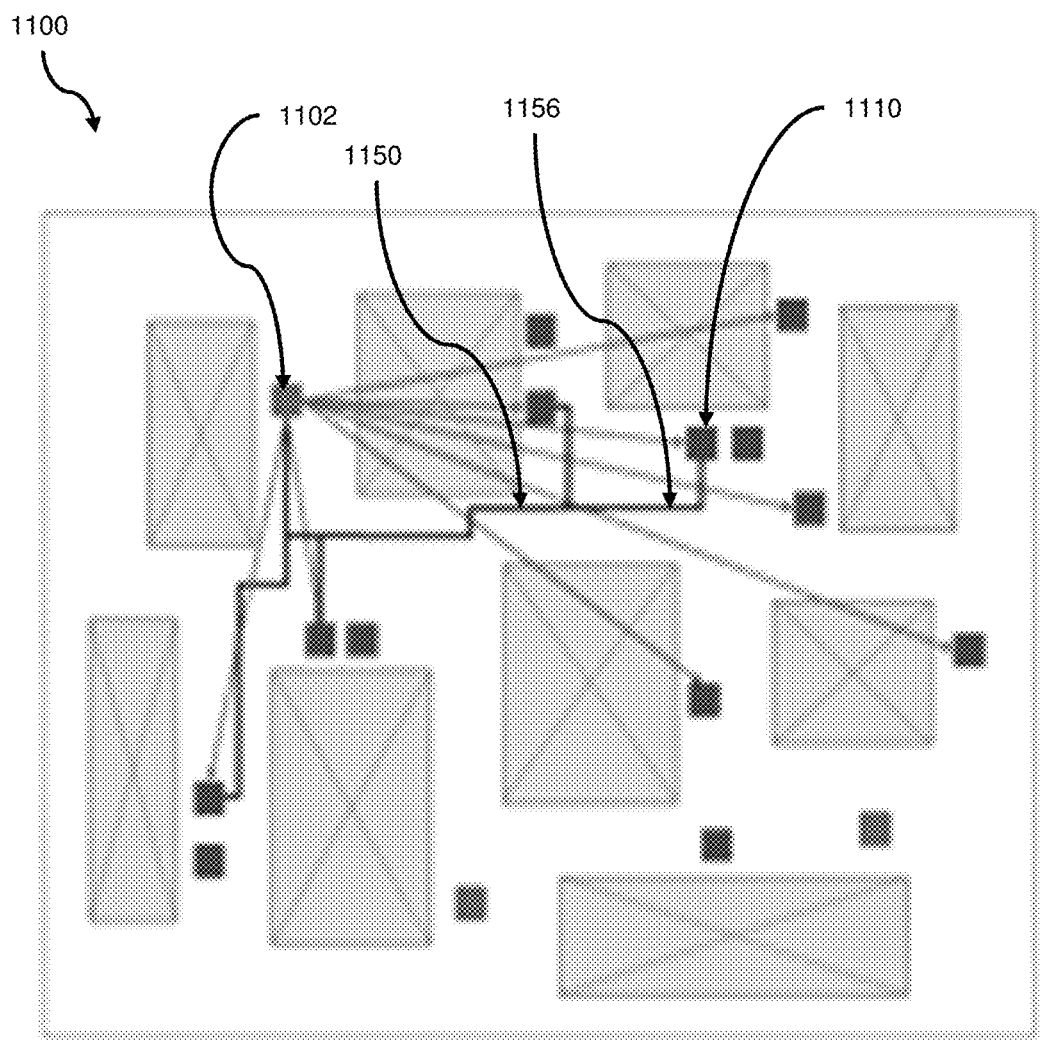

Referring now to FIG. 11D, a new closest sink node 1110 is selected. The sink node 1110 is connected, using path 1156, to the trunk 1150 by executing the collision-free path finder. The generated path 1156 is processed to generate a chain of internal nodes connected through canonical segments. This chain, which represents the path 1156, is then added to the existing graph for the trunk 1150.

Figure 11E:
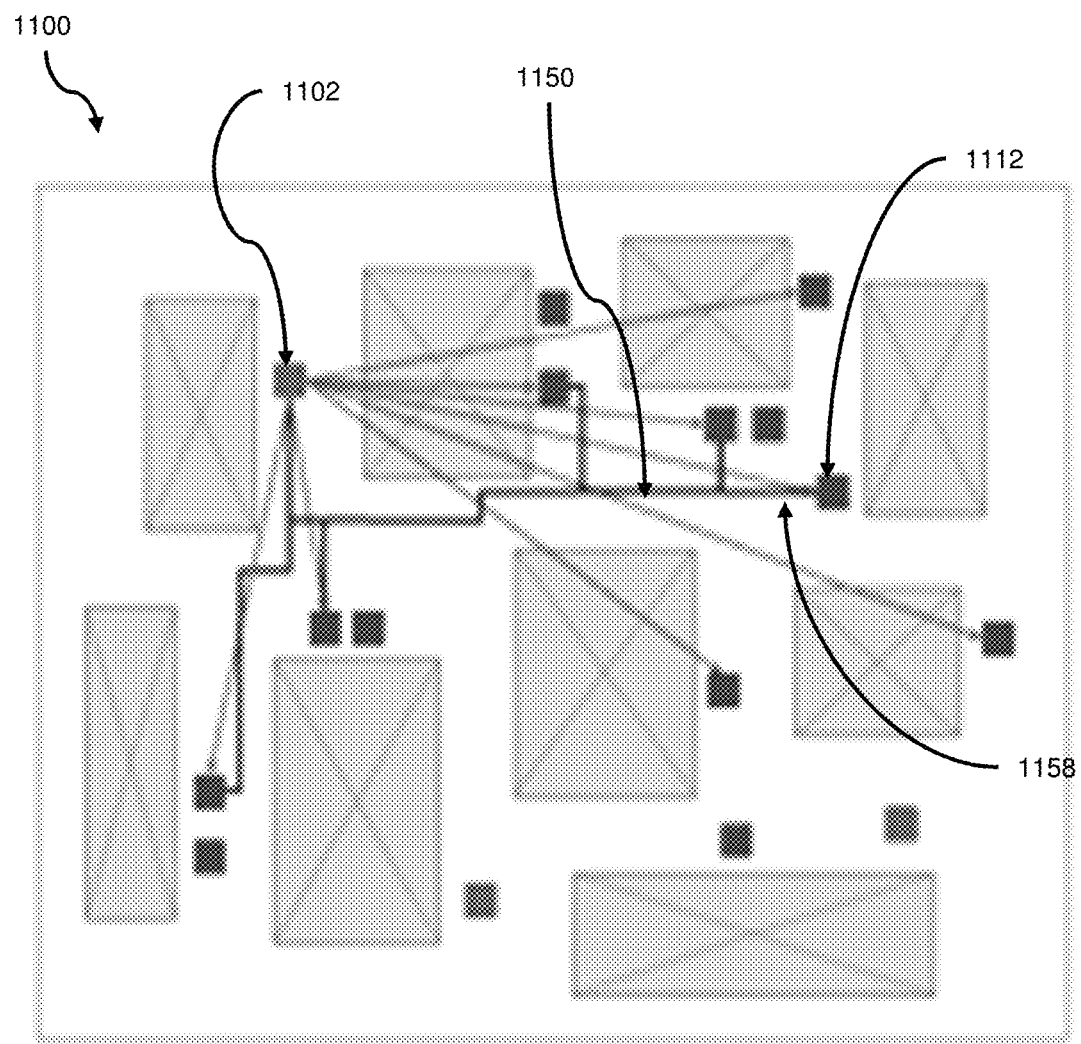

Referring now to FIG. 11E, a new closest sink node 1112 is selected. The sink node 1112 is connected to the trunk 1150, which is through path 1158, by executing the collision-free path finder. The generated path 1158 is processed to generate a chain of internal nodes connected through canonical segments. This chain, which represents the path 1158, is added to the existing graph for the trunk 1150.

Figure 11F:
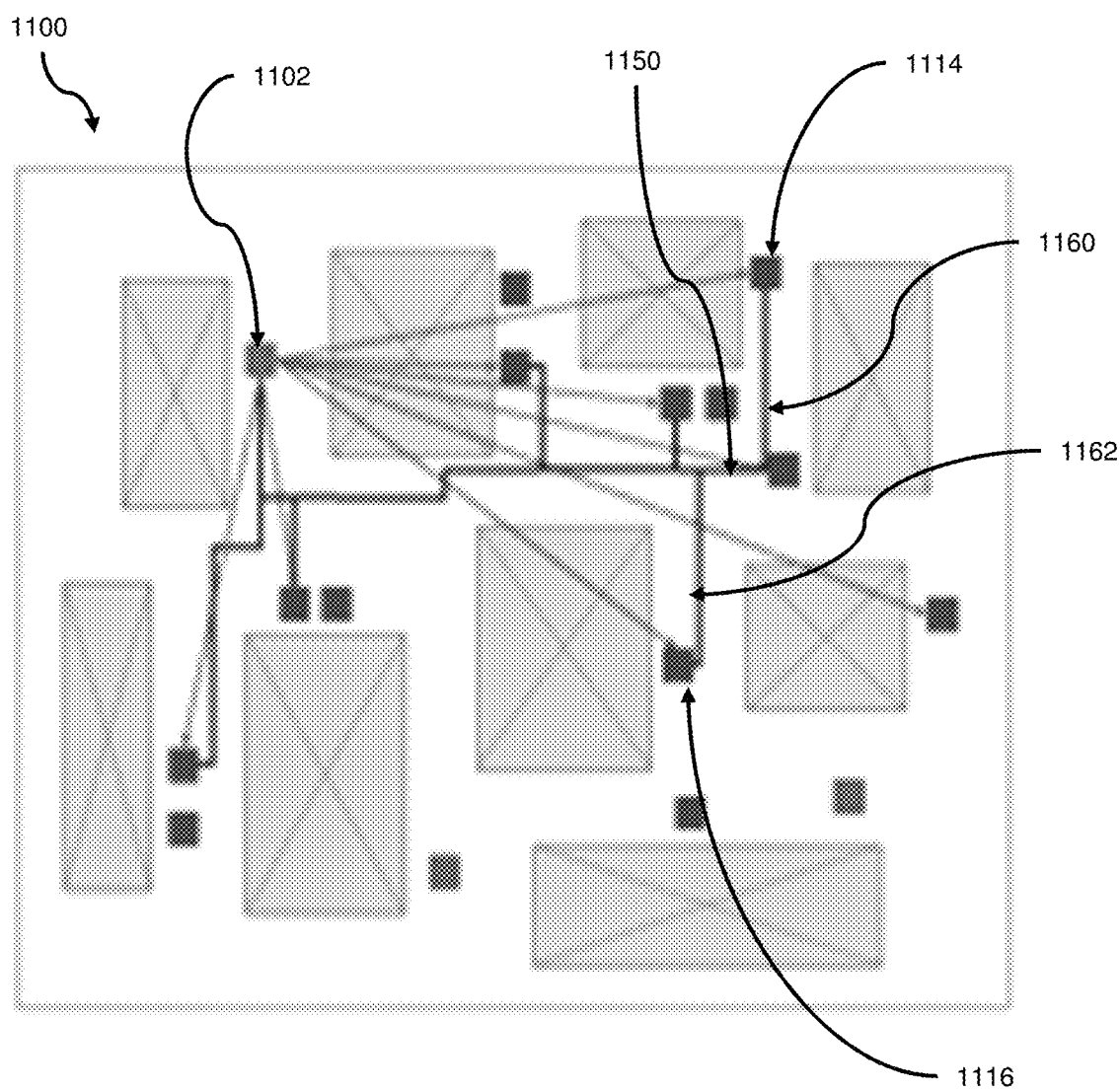

Referring now to FIG. 11F, the process continued and a new closest sink node is selected. In accordance with some aspects of the invention, the sink nodes 1114 and 1116 are selected. The sink node 1114 is connected to the trunk 1150, which is through path 1160. The sink node 1116 is connected to the trunk 1150 through path 1162. The generated paths 1160 and 1162 are processed to generate a chain of internal nodes connected through canonical segments. These chains, which represents the paths 1160 and 1162 respectively, are added to the existing graph for the trunk 1150.

Figure 11G:
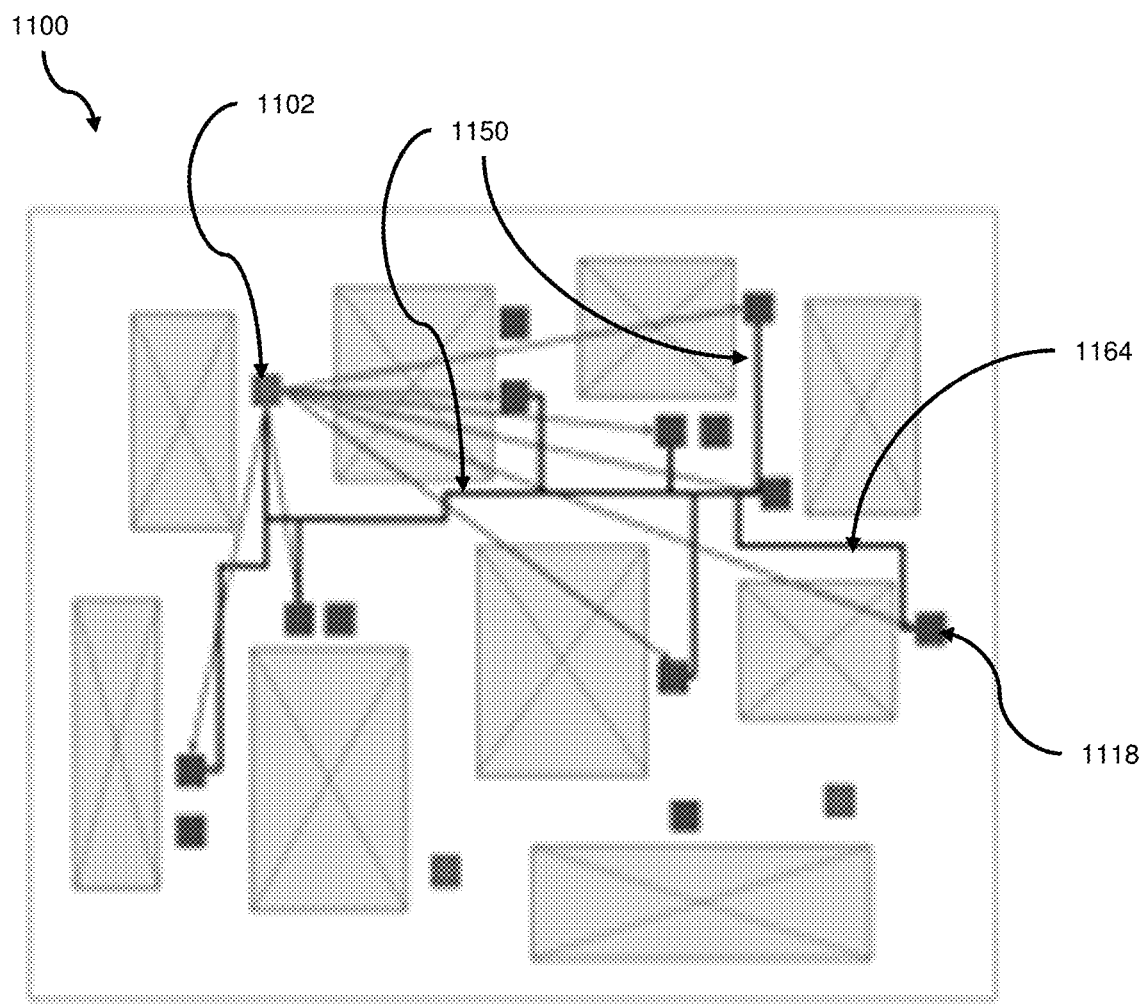

Referring now to FIG. 11G, a new and final closest sink node 1118 is selected. The sink node 1118 is connected to the trunk 1150 through path 1164. The path 1164 is generated by executing the collision-free path finder. The path 1164 is processed to generate a chain of internal nodes connected through canonical segments. This chain, which represents the path 1164, is added to the existing graph for the trunk 1150.

Figure 11H:
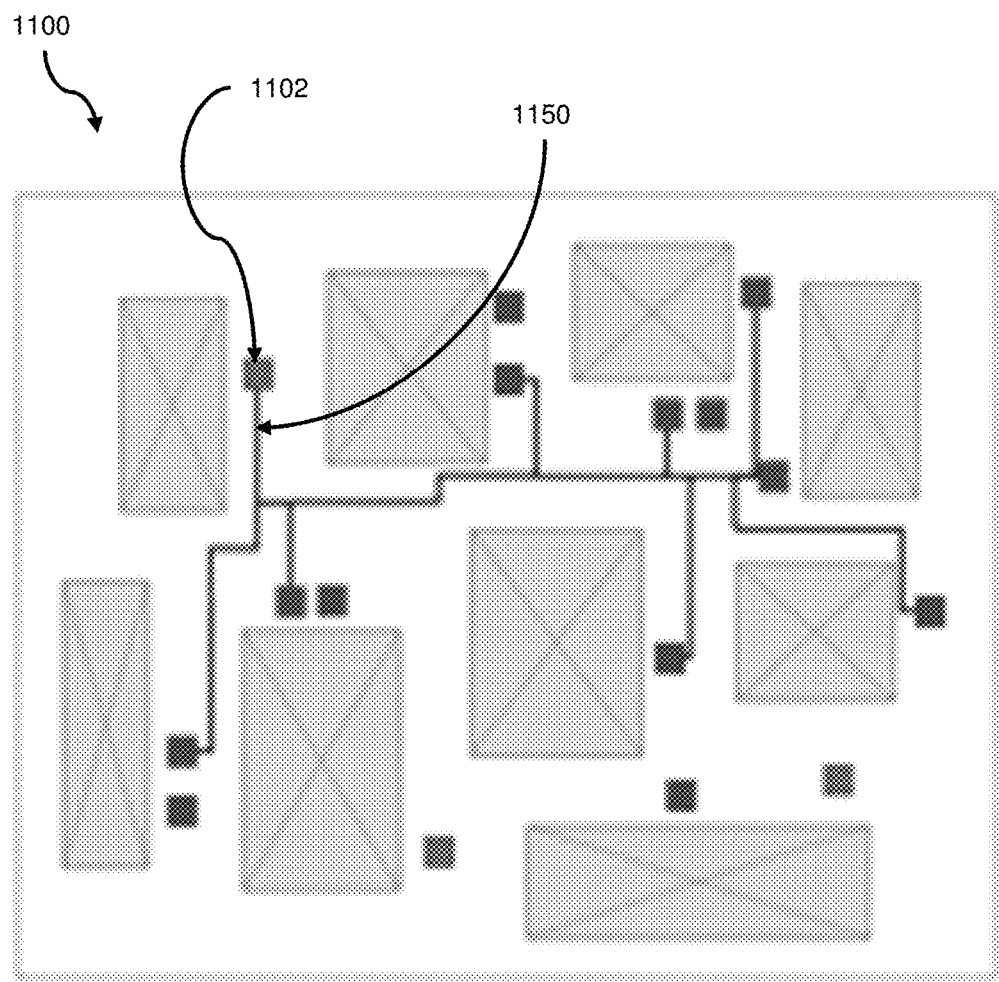

Referring now to FIG. 11H, the network 1100 is shown with a roadmap 1150 for connecting all the sink nodes to the source node 1102 in accordance with various aspects and embodiments of the invention. The process of selecting or choosing the closest point results in generating a (near-) optimal final tree for the roadmap 1150 and, hence, a (near-) optimal roadmap. Unlike classical techniques for topology synthesis, the system's wire length computation augments the widely used Manhattan distance with a more informative path length data. In addition, path indexation allows all synthesis decisions to be based on proximity of nodes by using distances based upon true collision-free paths. The proximity of the closest point is approximated first through an "augmented" Manhattan distance that accounts for approximate detours around the forbidden regions. The distance is then used to score the pair of points and sort the pair of points in a list. Collision-free path planning is executed for the best pair, which is the pair with the shortest distance between nodes.

Figure 12:
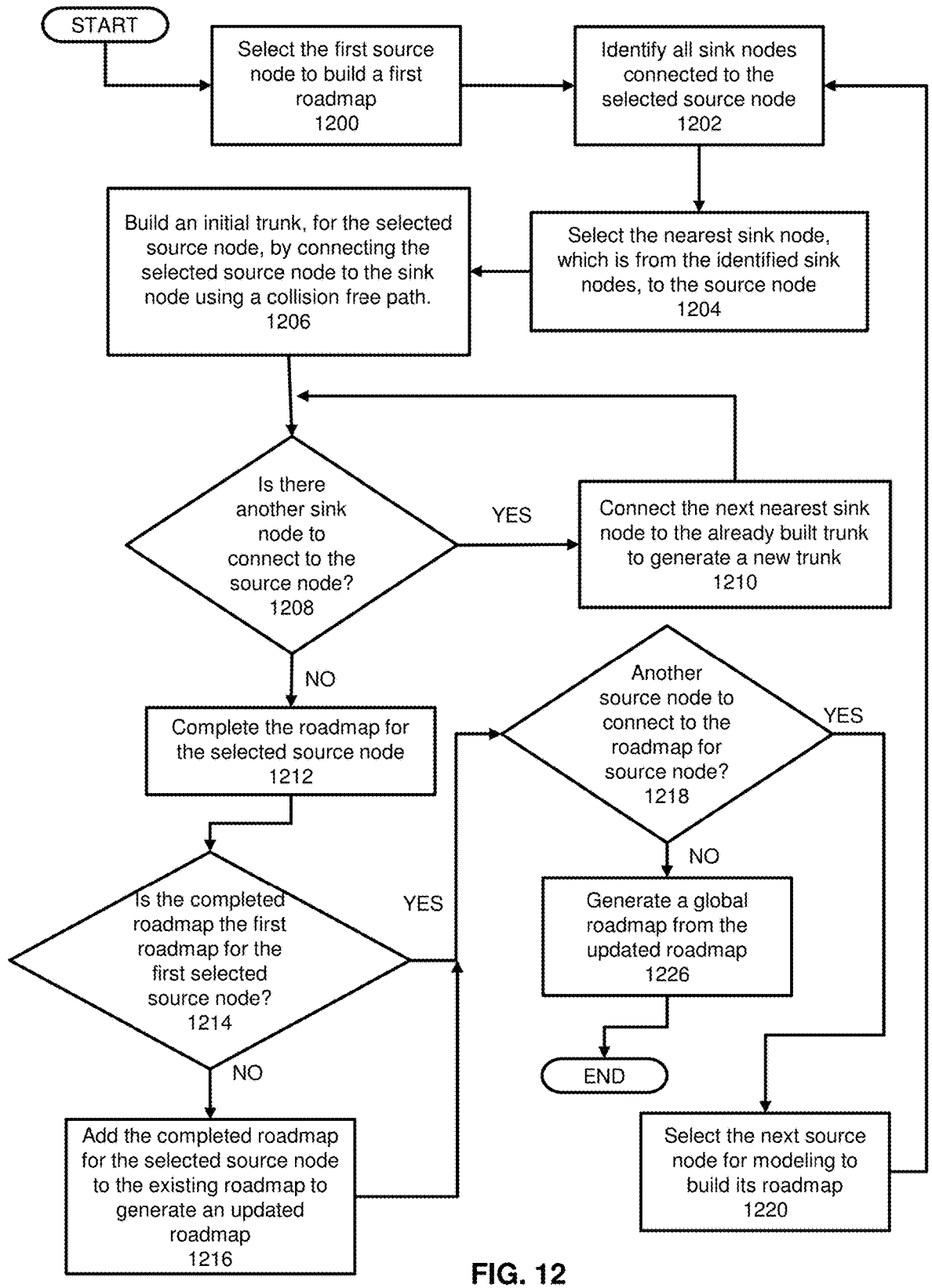
FIG. 12 shows a process for generating a global roadmap for a plurality of source nodes and the sinks connected to each of the source nodes in accordance with the various aspects and embodiments of the invention.

Referring now to FIG. 12, a process is shown for generating a roadmap that is used as guidance for synthesis of networks that are subject to physical constraints. At step 1200 a source node is identified. There may be many source nodes; the process can be repeated for all of the source nodes. At step 1202 all the sink nodes that are in communication with the source node are identified. The distance of each sink node from the source node is identified, taking into account that the distance represents a collision free path. At step 1204 the closest sink node is selected from the list of sink nodes in communication with the source node. At step 1206, an initial path or trunk is generated between the source node and the first selected sink node. At step 1208, the system determines if there are other sink nodes that are in communication with the selected source node. If so, then at step 1210 the system selects the next closest sink node and connects it to the initial trunk to generate a new trunk, which has been expanded to include the connection to another sink node. The process returns to step 1208 to determine if there are other sink nodes that need to be incorporated in the roadmap and connected to the source node. If there are no other sink nodes to connect, then at step 1212 a final roadmap is generated from the trunk or path that has been built.

In accordance with the various aspects and embodiments of the invention, the source nodes are sorted with their respective sink nodes. Source nodes are ranked based on various parameters/factors. In accordance with some aspects of the invention, the source nodes are ranked based on sink node spread factor value. The process proceeds iteratively throughout the list of sorted source nodes, in decreasing order of sink node spreading factor value. In accordance with other aspects of the invention, the source nodes are ranked based on other parameters/factors, such as performance, power domain, clock domain, or any combination. The leaves of an individual roadmap are the sinks that are connected to a source node. Once generated, the paths defining the individual roadmap are traversed and merged with existing paths of a global roadmap under construction. At each iteration, another (or new) source node is selected and an individual roadmap starting at it is generated. Accordingly, at step 1214 the system determines if the final roadmap that was just generated is a first generated roadmap for the first selected source node from the sorted list of source nodes. If not, then the process continues to step 1216 where the complete final roadmap that was just generated is added to an existing roadmap to generate an updated roadmap, which includes the combined roadmap of at least two source nodes, in accordance with some aspects and embodiment of the invention.

The process continues to step 1218. If at step 1214 the final roadmap is the first generated roadmap, then at step 1218 the system determines if there are other source nodes, for which a roadmap needs to be built. If so, then at step 1220 the next source node is selected and the process continues to step 1202. If at step 1218, the system determines that there are no other source nodes, then at step 1226 the system generates a global roadmap that combines the roadmaps built for each source node. In accordance with some aspects of the invention, the global roadmap is generated by collapsing various roadmaps for various source nodes. For example, two roadmaps for two different source nodes are selected and collapsed to generate a collapsed roadmap. Then another source node's roadmap is selected and collapsed with the existing collapsed roadmap. The process is repeated until all the roadmaps are collapsed to generate a global roadmap. There are numerous factors or parameters that are considered when selecting two different roadmaps for two source nodes to collapse. The scope of the present invention is not limited by the factors used to select two different roadmaps that are collapsed.

Figure 13:
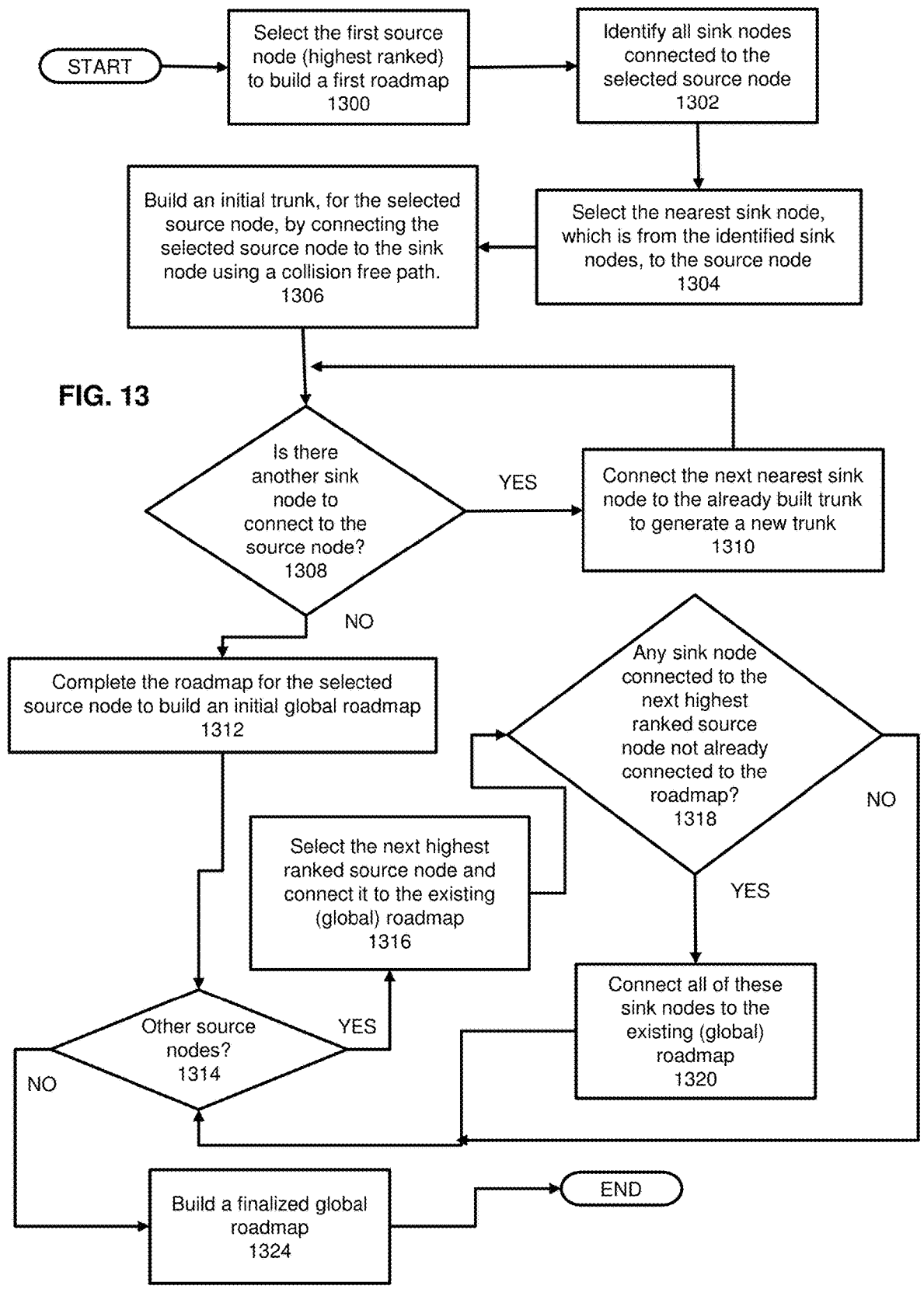
FIG. 13 shows a process for generating a global roadmap from a source node to all sinks connected to the source node by adding each source node to the roadmap in accordance with the various aspects and embodiments of the invention.

Referring now to FIG. 13, a process is shown for generating a roadmap used for synthesis of networks that are subject to physical constraints. The source nodes of a network are identified and ranked using various parameters/factors, as noted herein. In accordance with the various aspects and embodiments of the invention, the source nodes are sorted with their respective sink nodes. The process proceeds iteratively throughout the list of sorted source nodes, in decreasing order of sink node spread factor value. In accordance with some aspects of the invention, there may be many source nodes in the network; the process can be repeated for all of the source nodes. In accordance with some aspects of the invention, there may be only one source node in the network for which a roadmap is generated. At step 1300 a source node is identified and selected, which is the highest ranked source node. At step 1302 all of the sink nodes that are in communication with the source node are identified. The distance of each sink node from the source node is identified; the distance represents a collision free path in accordance with various and embodiments of the invention. At step 1304 the closest sink node to the source node is selected from the list of sink nodes in communication with the source node. At step 1306, an initial path or trunk is generated between the source node and the first selected sink node.

At step 1308, the system determines if there are other sink nodes in communication with the source node that need to be connected to source node through the roadmap. If so, then at step 1310 the system selects the next closest sink node and connects it to the initial trunk (roadmap being generated) to generate a new trunk, which is expanded to include the connection to another sink node. The process returns to step 1308 to determine if there are other sink nodes that need to be incorporated in the roadmap and connected to the source node. If there are no other sink nodes to connect, then at step 1312 a final roadmap is generated for the selected source node, from the trunk or path that has been built.

Once the roadmap, which is also the existing roadmap, for the selected source node is generated, other paths for other source nodes, each of which can be used to generate an individual roadmap. The system traverses that paths and merges the paths with the existing path represented by the final roadmap that was just generated for the selected source node. In this way, the system builds or constructs a global roadmap. At each iteration, another (or new) source node is selected. At step 1314 the system determines if there is another source node to add to the existing roadmap. If not, then at step 1324 the system generated a finalized global roadmap. If at step 1314 the system determines there are other source nodes to add, then at step 1316 the next highest ranked source node is selected. The next highest ranked source node is connected to the existing (global) roadmap at the closest possible connection point.

At step 1318, the system analyzes information about all the sink nodes communicating with the next highest ranked source node, which was just connected, to determine if there are any sink nodes not already connected to the existing (global) roadmap. If there are sink nodes NOT connected to the existing (global) roadmap, then at step 1320, the sink nodes are connected to the existing (global) roadmap to generate an updated global roadmap. The process then continues to step 1314 to determine if there are additional source nodes that need to be connected to the updated global roadmap. If at step 1318, the system determines that all of the sink nodes in communication with the next highest ranked source node are already connected to the existing roadmap, then the process continues to step 1314.

Certain methods according to the various aspects of the invention may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code comprising instructions according to various example.

Certain examples have been described herein and it will be noted that different combinations of different components from different examples may be possible. Salient features are presented to better explain examples; however, it is clear that certain features may be added, modified, and/or omitted without modifying the functional aspects of these examples as described.

Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

To the extent that the terms "including", "includes", "having", "has", "with", or variants thereof are used in either the detailed description and the claims, such terms are intended to be inclusive in a similar manner to the term "comprising."

The scope of the invention, therefore, is not intended to be limited to the exemplary embodiments and aspects that are shown and described herein. Rather, the scope and spirit of the invention is embodied by the appended claims.

What is claimed is:

1. A method for generation of a physical roadmap used in network topology synthesis, the method comprising:
   selecting a source node from a plurality of source nodes, wherein each source node of the plurality of source nodes has a location corresponding to a location of an initiator within a floorplan;
   identifying a group of sink nodes from a plurality of sink node, wherein each sink node in the group of sink nodes has a location corresponding to a location of a target with the floorplan and the group of sink nodes are in communication with the source node;
   selecting a first sink node from the group of sink nodes, wherein the first sink node is nearest to the source node;
   building an initial physical trunk between the source node and the first sink node, wherein the physical trunk is placed within free spaces in the physical floorplan;
   selecting each of the remaining sink nodes in the group of sink nodes in order of physical proximity to the source node;
   adding each of the remaining sink nodes, in the order selected, to the initial physical trunk to generate a new roadmap with addition of each of the remaining sink nodes until all sink nodes in the group of sink nodes are connected to the source node through a completed roadmap;
   generate the physical roadmap using the completed trunk roadmap for the source node and the group of sink nodes in communication with the source node.

2. The method of claim 1, wherein the physical roadmap is used to guide the network topology synthesis of a network that is a cycle-free network.

3. The method of claim 1, wherein the step of adding includes generating nodes for connectivity between any sink node and a current roadmap.

4. The method of claim 1, wherein the roadmap includes at least one corridor with two edges.

5. A non-transitory computer readable medium for storing code, which when executed by one or more processors, would cause a system to:
   select a source node from a plurality of source nodes, wherein each source node of the plurality of source nodes has a location corresponding to a location of an initiator within a floorplan;
   select a first sink node from the plurality of sink nodes, the first sink node being physically nearest to the source node and the first sink node has a location corresponding to a location of a first target with the floorplan;
   build a first physical communication link between the source node and the first sink node;
   select a second sink node from a plurality of sink nodes, the second sink node has a location corresponding to a location of a second target with the floorplan and is next nearest in physical proximity to the source node;
   build a second physical communication link between the second sink node and the source node by connecting to the second sink node to the first physical communication link;
   complete all other physical communication links between the source node and remaining sink nodes from the plurality of sink nodes to generate a completed physical communication path; and
   generate a physical roadmap for the source node using the completed physical communication path.

6. A system for generating a near-optimal physical roadmap model for guiding synthesis of a floorplan, the system comprising:
   a processor;
   an input module for receiving input information from a user, the input module is in communication with the processor and the input information includes information about the floorplan including physical constraints; and
   memory for storing code that is executed by the processor and for storing the input information received from the user,
   wherein the processor executes the code to:
      select a source node from a plurality of source nodes and its respective sink nodes that are communicating with the source node, wherein each source node of the plurality of source nodes has a location corresponding to a location of an initiator within a floorplan and each sink node has a location corresponding to a location of a target within the floorplan;
      analyze required communication paths between the source node and its respective sink nodes;
      connect each sink node to a physical path originating from the source node, such that each sink node, which is selected in order of physical proximity to the source node, is connected to the source node by adding a new physical path to the physical path originating from the source node;
      produce a completed physical path for the source node and its respective sink nodes;
      produce additional completed physical paths by executing the select, the analyze, and the connect for each remaining plurality of source nodes and each source nodes' respective sink nodes; and
      generate the near-optimal physical roadmap model for the plurality of source nodes based on combining the completed physical path and the additional completed physical paths for the plurality of source nodes.

7. A method for generation of a global physical roadmap used in network topology synthesis, the method comprising:
   ranking a plurality of source nodes, wherein each source node of the plurality of source nodes has a location corresponding to a location of an initiator within a floorplan;
   selecting a highest ranked source node from the plurality of source nodes;
   identifying a group of sink nodes from a plurality of sink node, wherein each sink node of the plurality of sink nodes has a location corresponding to a location of a target within the floorplan wherein the groups of sink nodes are in communication with the highest ranked source node;
   building an initial global physical roadmap by connecting the group of sink nodes to the highest ranked source node;
   selecting the next highest ranked source node from the plurality of source nodes connecting the next highest ranked source node to the initial global physical roadmap;

determining if any sink nodes in communication with the next highest ranked source node are not connected to the initial global physical roadmap; and connecting, to the initial global physical roadmap, the sink nodes not already connected to the initial global physical roadmap to generate an updated global physical roadmap.

8. The method of claim 7 further comprising the step of selecting each of the remaining plurality of source nodes and connecting each to the updated global physical roadmap.

* * * * *